(12) United States Patent
Yim et al.

(10) Patent No.: US 12,726,788 B2
(45) Date of Patent: Sep. 1, 2026

(54) LOCATION BASED RETAIL MEDIA AND AD ATTRIBUTION SYSTEM

(71) Applicant: DENSO International America, Inc., Southfield, MI (US)

(72) Inventors: Wilson Yim, Ann Arbor, MI (US); Thomas Krzyzak, Livonia, MI (US); Sibu Varughese, Shelby Township, MI (US); Matthew Johnson, Oak Park, MI (US); Martin Nespolo, Grosse Pointe Woods, MI (US); Justin Mcbride, South Lyon, MI (US); Andrew Bianchi, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 18/736,709

(22) Filed: Jun. 7, 2024

(65) Prior Publication Data

US 2024/0412255 A1 Dec. 12, 2024

Related U.S. Application Data

(60) Provisional application No. 63/570,487, filed on Mar. 27, 2024, provisional application No. 63/570,500,
(Continued)

(51) Int. Cl.
*G06Q 30/0251* (2023.01)
*G06Q 30/0601* (2023.01)
(Continued)

(52) U.S. Cl.
CPC ........ *H04W 4/021* (2013.01); *G06Q 30/0261* (2013.01); *G06Q 30/0269* (2013.01);
(Continued)

(58) Field of Classification Search
None
See application file for complete search history.

(56) References Cited

U.S. PATENT DOCUMENTS 7,792,710 B2 9/2010 Bonner et al.
7,821,453 B2 * 10/2010 Wu ...................... G01S 5/0289 342/372

(Continued)

FOREIGN PATENT DOCUMENTS

KR 101779094 7/2017

OTHER PUBLICATIONS

Uptin Saiidi, “Retailers can track your movements inside their stores. Here’s how”, retrieved from https://www.cnbc.com/2019/03/08/how-retailers-can-track-your-movements-inside-their-stores.html, available on Mar. 7, 2019 (Year: 2019).*

*Primary Examiner* — Sam Refai
(74) *Attorney, Agent, or Firm* — Harness, Dickey & Pierce, P.L.C.

(57) ABSTRACT

A method and system for providing advertisements to user device includes determining a first location of a user device within a premises. The user device is associated with a user device identifier. The method further includes communicating the user device identifier to an on-premises controller, matching a user profile to the user device identifier, identifying a product associated with the first location of the user device, communicating product data associated with the product to a controller, and communicating an advertisement to the user device from the controller based on the product data.

16 Claims, 20 Drawing Sheets

Related U.S. Application Data filed on Mar. 27, 2024, provisional application No. 63/570,492, filed on Mar. 27, 2024, provisional application No. 63/515,928, filed on Jul. 27, 2023, provisional application No. 63/512,754, filed on Jul. 10, 2023, provisional application No. 63/507,244, filed on Jun. 9, 2023, provisional application No. 63/520,160, filed on Aug. 17, 2023, provisional application No. 63/520,159, filed on Aug. 17, 2023, provisional application No. 63/515,942, filed on Jul. 27, 2023, provisional application No. 63/515,939, filed on Jul. 27, 2023, provisional application No. 63/515,936, filed on Jul. 27, 2023, provisional application No. 63/515,932, filed on Jul. 27, 2023, provisional application No. 63/512,751, filed on Jul. 10, 2023.

(51) Int. Cl.

*G06T 7/70* (2017.01)
*H04W 4/021* (2018.01)
*G01S 5/02* (2010.01)

(52) U.S. Cl.

CPC ........... *G06Q 30/0639* (2013.01); *G06T 7/70* (2017.01); *G01S 5/0264* (2020.05); *G01S 2205/09* (2020.05)

(56) References Cited

U.S. PATENT DOCUMENTS 7,856,368 B2 12/2010 Avallone et al.
8,050,984 B2 11/2011 Bonner et al.
9,460,453 B2 10/2016 Rider et al.
9,756,607 B1 * 9/2017 DeLuca ................ H04W 64/00
10,168,414 B2 * 1/2019 Chen ..................... G01S 5/0218
10,242,384 B2 3/2019 Otis et al.
10,360,593 B2 7/2019 Hunter et al.
10,776,804 B2 9/2020 Avallone et al.
11,455,649 B2 9/2022 Mohiuddin et al.
11,615,430 B1 3/2023 Sharma et al.
11,880,788 B1 1/2024 Ho et al.
11,881,091 B1 1/2024 Schoner
2008/0004796 A1 * 1/2008 Schott .................. G01C 21/005 701/434
2008/0004950 A1 1/2008 Huang et al.
2011/0055090 A1 3/2011 Ross
2012/0190386 A1 7/2012 Anderson
2013/0297422 A1 * 11/2013 Hunter ................... H04H 60/63 705/14.58
2013/0317916 A1 11/2013 Gopalakrishnan et al.
2013/0332273 A1 12/2013 Gu et al.
2014/0279015 A1 9/2014 Root et al.
2014/0351051 A1 * 11/2014 Root .................. G06Q 30/0259 705/14.57
2015/0029339 A1 1/2015 Kobres et al.
2016/0117877 A1 4/2016 Hamada et al.
2016/0357954 A1 12/2016 Guionneau et al.
2017/0011423 A1 1/2017 Douglas et al.
2017/0053330 A1 2/2017 Smith et al.
2017/0068984 A1 * 3/2017 Joshi .................. G06Q 30/0239
2017/0148005 A1 5/2017 Murn
2017/0352215 A1 12/2017 Maiwand et al.
2018/0099643 A1 4/2018 Golsch et al.
2018/0218441 A1 8/2018 Kumar et al.
2019/0304216 A1 10/2019 Mendelson et al.
2020/0162840 A1 5/2020 Lipman et al.
2020/0202177 A1 6/2020 Buibas et al.
2021/0185473 A1 6/2021 Pitti
2021/0241336 A1 * 8/2021 Zadoks ................... H04W 4/06
2022/0030395 A1 * 1/2022 Smith ................... H04W 4/023
2022/0343360 A1 10/2022 Mohiuddin et al.
2023/0008200 A1 1/2023 Budano et al.
2023/0153753 A1 5/2023 Rochon et al.
2024/0362678 A1 10/2024 Ahuja et al.

* cited by examiner

LOCATION BASED RETAIL MEDIA AND AD ATTRIBUTION SYSTEM

CROSS-REFERENCE TO RELATED APPLICATION

This application claims the benefit of U.S. Provisional Application No. 63/507,244, filed Jun. 9, 2023, and U.S. Provisional Application No. 63/512,751 filed Jul. 10, 2023, and U.S. Provisional Application No. 63/570,487 filed Mar. 27, 2024, and U.S. Provisional Application No. 63/512,754 filed Jul. 10, 2023, and U.S. Provisional Application No. 63/520,159 filed Aug. 17, 2023, and U.S. Provisional Application No. 63/570,500 filed Mar. 27, 2024, and U.S. Provisional Application No. 63/515,928 filed Jul. 27, 2023, and U.S. Provisional Application No. 63/515,932 filed Jul. 27, 2023, and U.S. Provisional Application No. 63/515,936 filed Jul. 27, 2023, and U.S. Provisional Application No. 63/570,492, filed Mar. 27, 2024, and U.S. Provisional Application No. 63/515,939 filed Jul. 27, 2023, and U.S. Provisional Application No. 63/520,160 filed Aug. 17, 2023, and U.S. Provisional Application No. 63/515,942 filed Jul. 27, 2023. The entire disclosures of the above applications are incorporated herein by reference.

FIELD

The present disclosure relates generally to a retail monitoring and tracking system and, more specifically, to various methods and systems for providing an improved user experience and allowing retailer to have the benefit of further data.

BACKGROUND

This section provides background information related to the present disclosure which is not necessarily prior art.

A retail experience for a customer has the customer moving through the retail environment and placing products within a cart. Various fixed displays are provided by the retailer or the consumer packaged goods (CPG) provider. Besides purchase data, very little data is available to the merchant relative to the products, the consumer purchasing the product and various other types of data. Consumers, on the other hand, beside the store displays that are fixed are provided with no customized information regarding purchases.

SUMMARY

This section provides a general summary of the disclosure, and is not a comprehensive disclosure of its full scope or all of its features.

The present disclosure provides a method and system for providing useful information to consumers in a retail environment to encourage purchases and request further information regarding purchases. Further, the retailer is also provided various types of data that allows the retailer to provide targeted marketing, store layout and other improvement to ultimately help the consumers.

In one aspect of the disclosure, a method and system for providing advertisements to user device includes determining a first location of a user device within a premises. The user device is associated with a user device identifier. The method further includes communicating the user device identifier to an on-premises controller, matching a user profile to the user device identifier, identifying a product associated with the first location of the user device, communicating product data associated with the product to a controller, and communicating an advertisement to the user device from the controller based on the product data.

In another aspect of the disclosure, a system includes an on-premises controller determining a first location of a user device within a premises. The user device is associated with a user device identifier. A user device communicates the user device identifier to an on-premises controller. The on-premises controller matches a user profile to the user device identifier, identifies a product associated with the first location of the user device, receives product data associated with the product, updates the user profile to form an updated user profile based on the product data, and communicates an advertisement to the user device based on the updated user profile.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
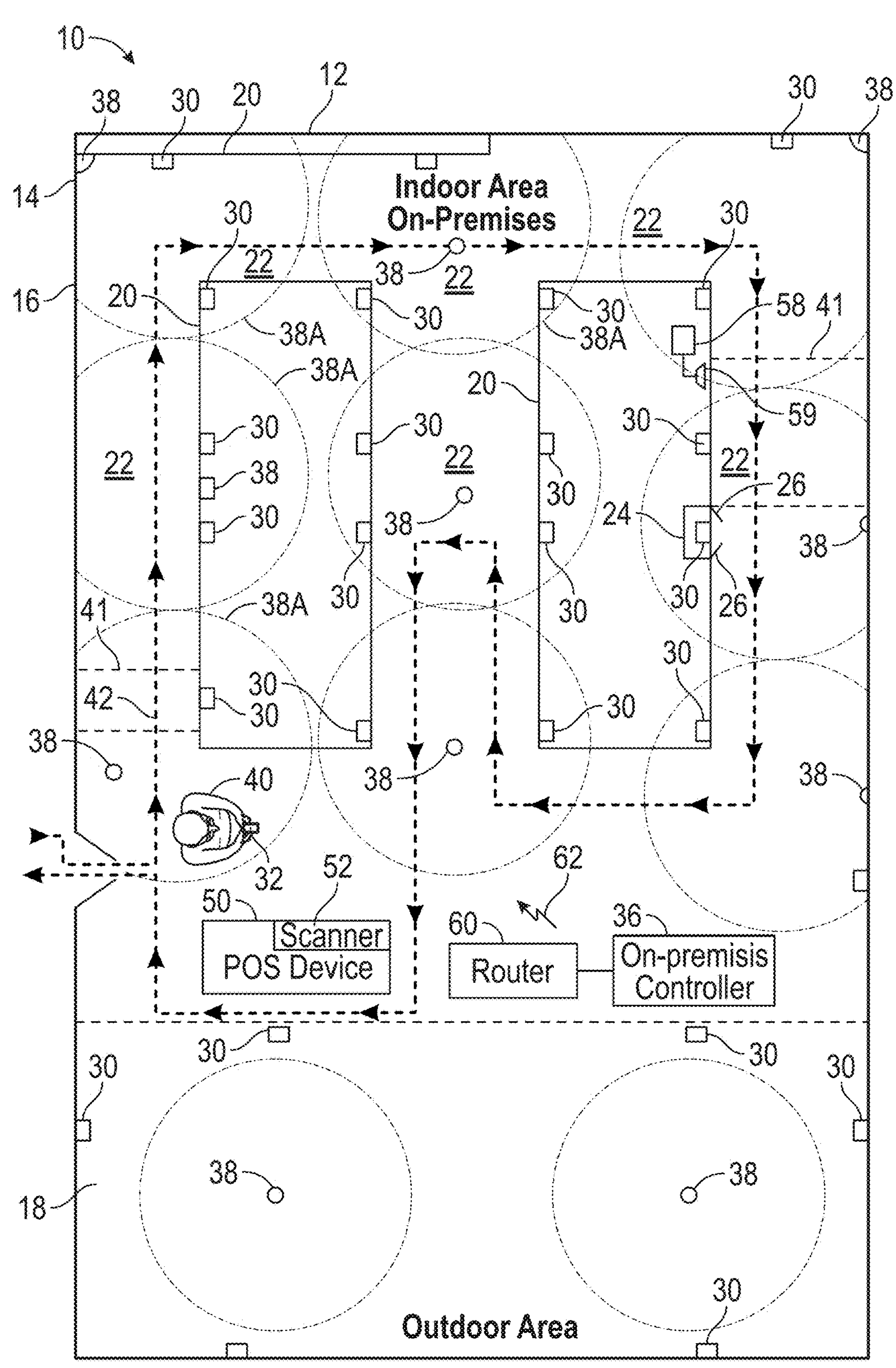
FIG. 1 is a diagrammatic view of a premises having various shelving units and sensors therein.

Example embodiments will now be described more fully with reference to the accompanying drawings.

A retail control system 10 is illustrated having a premises 12. A premises 12 may be defined by walls 14 of a building that has an indoor portion 16. The premises 12 may also include other portions of a retail location including an outdoor location 18 and portions of the parking lot, outbuildings or sidewalk outside. A very simplified view of an indoor portion 16 is set forth in FIG. 1. The indoor portion may include a plurality of shelving units 20. The shelving units 20 may be positioned to leave aisles 22 therebetween. The aisles 22 allow areas for consumers to pass so that products may be obtained from the shelving units 20. The shelving units 20 may also have display cases 24 or the display cases 24 may be separate items. The display cases 24 may have display case doors 26 that can be locked to protect valuable products from theft. Various numbers of display cases 24 may be used throughout a premises 12. All of the shelving units 20 may be replaced by display cases 24 in high crime areas.

A plurality of ranging sensors 30 may be provided around the premises 12 for determining the user or user device location. The ranging sensors 30 may receive signals from a user device 32. The user device 32 may communicate signals that include a user device identifier. The technology may be one technology for all of the ranging sensors 30 or a variety of types of technologies. For example, a Wi-Fi sensor, an RF sensor, a RSSI sensor, a sounding sensor, a Bluetooth sensor, a BLE sensor or a UWB sensor are examples of suitable types of ranging sensors. Ultimately, the ranging sensors 30 provide ranging signals to an on-premises controller 36. The ranging sensors 30 may provide a location signal and a direction of travel signal. For some technologies such as Bluetooth® the identifiers may change over time.

Cameras 38 may also be located within the premises 12 in the indoor portion 16 and the outdoor portion 18. The cameras 38 may be mounted to the walls or ceiling and positioned to provide coverage throughout the premises. Overlapping fields of view 38A and near complete coverage in the premises 12 may be provided depending on the spacing of the cameras 38. The ranging sensors 30 may provide location information based on the position of the user device 32. The cameras 38 provide more detailed information, such as orientation and allowing the user device 32 to be correlated with the position of a user 40.

The store may be divided into various zones 41, each zone may not necessarily correspond to a single field of view 38A or one ranging sensor 30. The Zones 41 may correspond to a zone classification associated with one or more products on the shelf. As described later, a planogram may be used in the determination of which products are in which zones.

As will be described in greater detail below, the combination of the fields of view 38A and the output of the ranging sensors 30 may provide the detailed location and therefore the user device journey data for a journey 42. The journey 42 may also have a time component associated therewith as is also described below. A dwell time at certain locations allows the products associated therewith to be associated with the journey 42.

At the end of the journey 42, certain examples in the detail description set for the below have the user 40 check out at a point of sale device 50. The point of sale device may have a scanner 52 for scanning the content being purchased by the user 40. Scanning by the scanner 52 may verify the contents removed from a display case 24.

A display 58 and speaker 59 may be used to display and communicate an audible signal or the advertisement to the user 40. The advertisements may be directed to the user 40 based upon a user profile of the user 40 and the location determined by the ranging sensors 30 and the cameras 38.

The ranging sensors 30 and the cameras 38 may be wired and connected directly to the on-premises controller 36. However, wireless communications through a router 60 may form the network 62.

Figure 2:
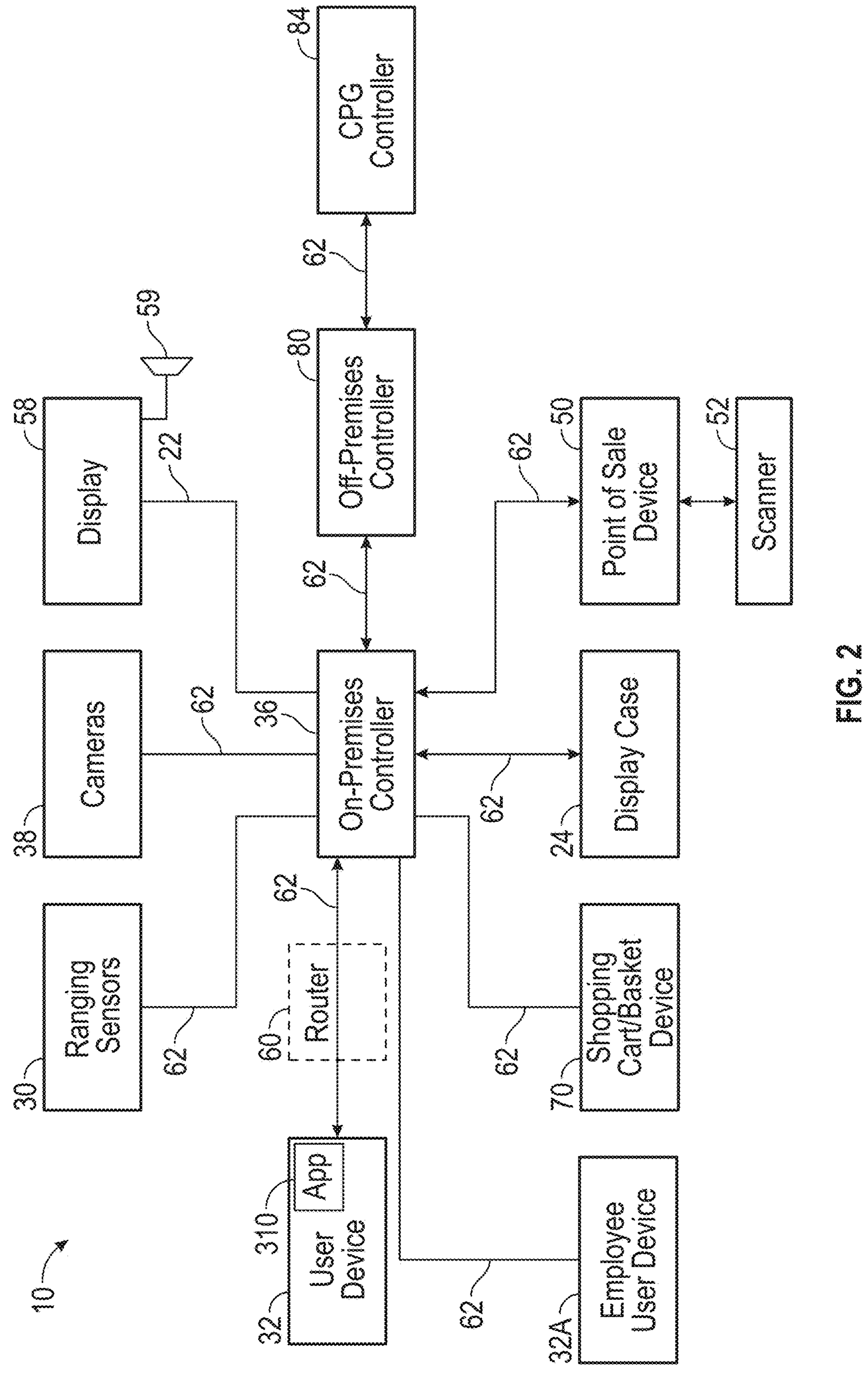
FIG. 2 is a simplified block diagrammatic view of the retail control system.

Referring now to FIG. 2, the retail control system 10 is illustrated in block diagrammatic form. The on-premises controller 36 is illustrated coupled to the ranging sensors 30, the cameras 38, the display 58, the speaker 59 the user device and an employee user device 32A and a display case 24 through the network 62. As mentioned above, the network 62 may be wired or wireless. One router 60 is illustrated between a user device 32 and the on-premises controller 36. However, all of the interconnections may be made through one or more routers 60. As will be described in greater detail below, the employee user device 32A may be configured in a similar manner to the user device 32 with the intent to be used by a store employee. As will be described below, the employee user device 32A may receive directions to locate the user device 32 to allow the employee of the store to offer assistance to the user of the user device 32. The system 10 may also include a shopping cart or basket device 70. The shopping cart or basket device 70 may include electronics for locating as described in greater detail below.

The system 10 may also include an off-premises controller 80. The off-premises controller 80 is in communication with the on-premises controller 36 through the network 62. The off-premises controller 80 may be in communication with one or more on-premises controllers 36. The off-premises controller 80 may control, for example, various high-level functions such as controlling the user profile for various users, providing advertisements to users once they are off-premises and several other functions as described in greater detail below.

The off-premises controller 80 may also be in communication with a consumer packaged goods (CPG) controller 84, which is a supplier or manufacturer of the products sold in the store. The CPG controller 84 may receive data from the off-premises controller 80 to allow improvements to be made to the goods or products provided by the CPG provider. Packaging, advertisements, placement and other types of modifications may be made by the CPG controller 84 based upon the data received from the off-premises controller 80.

Figure 3:
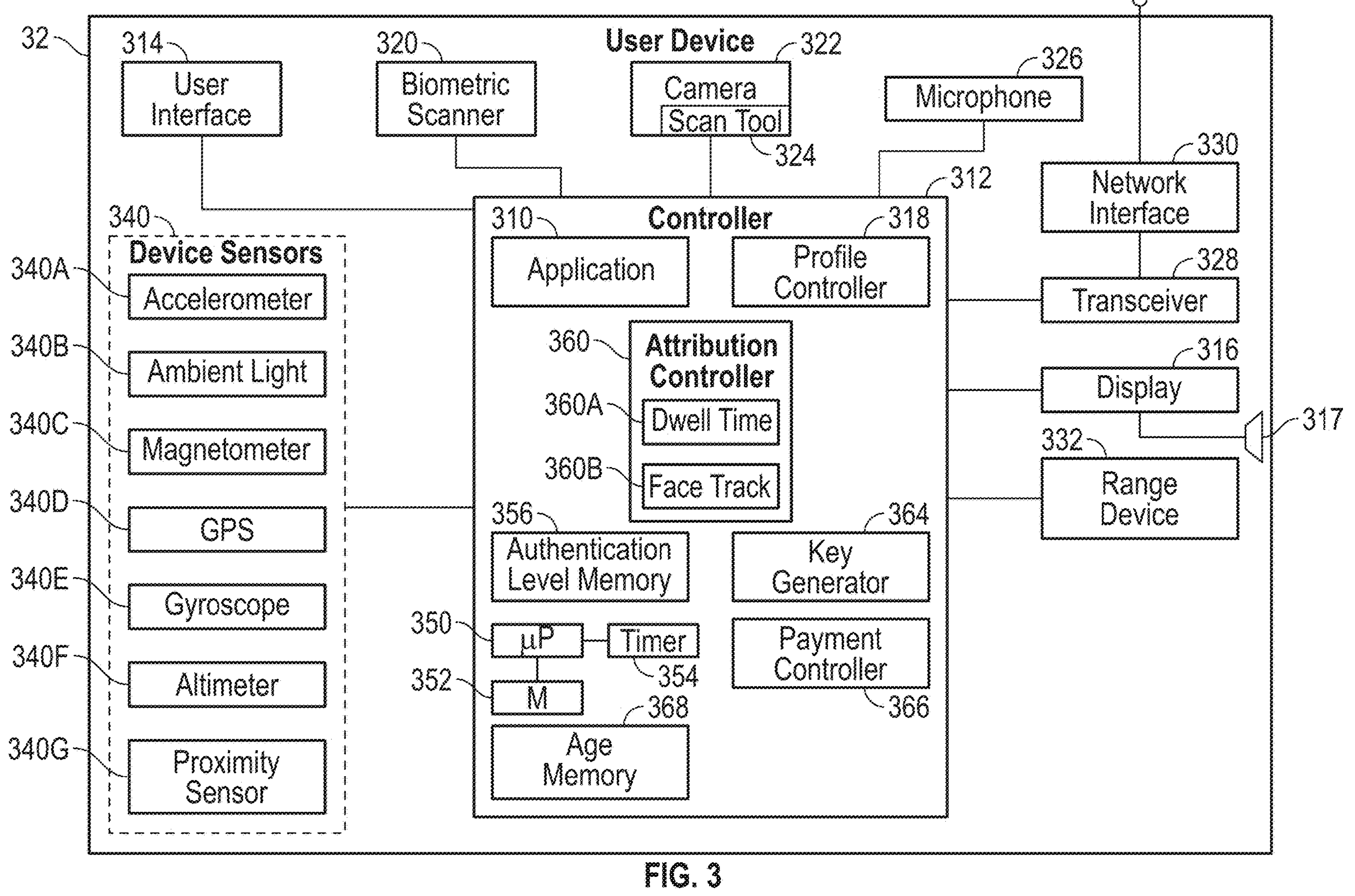
FIG. 3 is a block diagrammatic view of the user device.

Referring now to FIG. 3, the user device 32 may be a mobile device that has an application 310 that is controlled by a user device controller 312 to perform various functions. The user device 32 has a user interface 314 coupled to the controller 312 for inputting data. The user interface 314 may be physical buttons, a keyboard, switches or a touch screen device that may be part of a display 316. The display 316 may have a speaker 317 associated therewith. Audible, visual or both audible and visual advertisements may be provided. That is, the user interface 314 may have virtual buttons, dials or slides that are used for controlling various functions including inputting data to form a user profile in accordance with the profile controller 318 of the controller 312.

The user device 32 may also include a biometric scanner 320 that is used for providing biometric data to the controller 312. The biometric data 320 may include but is not limited to facial recognition data or fingerprint data or combinations thereof. A camera 322 may be used to provide biometric data such as facial data to the controller 312. The controller 312 may use the camera data from the camera 322 to determine a location, orientation or even nearby products, for example. The camera 322 may also be used to input biometric data such as facial data that is communicated to the controller 312. The camera 322 may also have a scan tool 324. The scan tool 324 uses images to request data or provide data relative to the product being contemplated for purchase or purchase. The scan tool 324 may scan the items being placed into a cart so that scanless checkout may be performed.

A microphone 326 may be used to provide data to the controller 312. The microphone 326 may be used to input voice commands for requesting different functions or providing data for different functions.

A transceiver 328 communicates and receives data signals to and from the network 62. A network interface 330 may be used to provide the connection to the network 62 to and from the transceiver 328. The transceiver 328 is both a transmitter to communicate data to the network 62 and has a receiver that is used to receive data from the network. Both a transmitter and receiver may be separately provided. The transceiver 328 may also generate signals such as Wi-Fi signal, RF signals, RSSI signals, sounding signals, Bluetooth signals, BLE signals or UWB signals that are ultimately communicated to a ranging sensor to allow a user device identifier to be sent and a range or location to be determined based on the signals.

A range device 332 may be used for communicating data signals to the ranging sensor 30. The range device 332 may thus generate a signal that includes a user device identifier that is communicated to the ranging sensors 30 so that the user device may be identified, and triangulation techniques may be used to determine the location of the user device within the premises 12.

The user device 32 also has a plurality of device sensors 340. The device sensors 340 are used for various purposes including determining the location of the user device 32 within the premises 12. The device sensors 340 may fine tune the location and/or orientation of the user device 32 relative to the shelving units 20 or the display cases 24 or both. The device sensors 340 may include, but are not limited to, an accelerometer 340A that generates acceleration signals in various directions. Typically, accelerators may be provided in three axial directions such as in a X direction, a Y direction and a Z direction. The accelerometer 340A may help locate the user device 32 as well as providing movement signals.

An ambient light sensor 340B generates a signal corresponding to the amount of light at the user device 32. The ambient light sensor 340B may help determine if the user device 32 is inside or outside of pocket/purse/etc.

A magnetometer 340C is used to generate signals corresponding to the orientation of the user device within a magnetic field, such as the magnetic field of the earth.

A global positioning sensor 340D (GPS sensor 340D) generates global positioning signals corresponding to the position of the user device 32 relative to the surface of the earth as determined by triangulation from signals emitting from satellites.

A gyroscope 340E generates gyroscope signals corresponding to the relative position of the user device 32. The gyroscope signals may include acceleration signals in various directions as well as moment signals about the various axes. The gyroscope 340E may therefore have X, Y and Z axes and generate acceleration signals corresponding thereto and the moment signals about each of those axes.

The device sensors 340 may also include an altimeter 340F. The altimeter signals from the altimeter 340F correspond to the altitude of the user device relative to sea level.

The device sensors 340 may also include a proximity sensor 340G that generates a signal corresponding to the proximity to a nearby object. The proximity signal may provide a distance or a relative measure to an object.

The controller 312 may be used for various functions including receiving user profile information such as various user information, user attributes and the like. The profile controller 318 may, for example, provide basic information such as establishing passwords, user residence location and the like. In addition, the profile controller 318 may store a plurality of user attributes such as the skin type, the hair type, other physical or medical attributes that allow marketing for specific products.

The controller 312 has a microprocessor 350 or "processor" that is in communication with a memory 352 and a timer 354. The memory 352 stores the programming, data and the like for performing various functions including for operating the application 310. The memory 352 may be a non-transitory computer-readable medium that includes machine readable instructions that are executable by the processor. The machine readable instructions include allowing the performance of various functions.

The controller 312 may also have an authentication level memory 356. The status level memory 356 is illustrated and is a separate memory from memory 352 although the memory 356 may be incorporated therein. The authentication level memory 356 may set an incentive level associated with the user device 32. By way of example, the authentication level memory 356 may provide levels of incentives to enable various functions within a premises 12. For example, the authentication level memory 356 may provide a first level that allows the opening of all of the display cases 24 within a premises 12. A medium or mid-level status may provide access to less than all of the display cases 24 within a premises 12. A third authentication level may allow access to even fewer display cases 24 than the mid-level status. The authentication level memory 356 may be used to store the authentication level that provides discounts or the like. Authentication levels may be achieved by various security clearances or the amount of spending at a retail chain.

An attribution controller 360 may be used to determine the attributions of a visit to a premises 12. The attribution controller 360 may determine a dwell time 360A or provide face tracking at 360B. By providing dwell time 360A and face tracking 360B, the locations of the user device and the orientation of the user device 32 may be determined.

A key generator 364 may generate and/or store a key for accessing various functions including accessing the display 24. As mentioned above, the authentication level memory 356 may also limit the operation of the key generator 364 to allow the key to order when a certain authentication level, status or incentive level is achieved at the authentication level memory 356.

A payment controller 366 is used to control the payment to the point of sale device or without the point of sale device. That is, a credit card or bank account information may be stored at the payment controller and communicated through a user interface or a range device 362 to make payment for various products.

An age memory 368 may store the age level of the user associated with or assigned to the user profile. The age level stored in the memory 368 may be used for marketing and for access purposes. For example, cigarettes and alcohol may be regulated by governmental authorities and therefore access to certain display cases below a certain age may be restricted. The age memory 368 may be incorporated into the memory 352.

Figure 4:
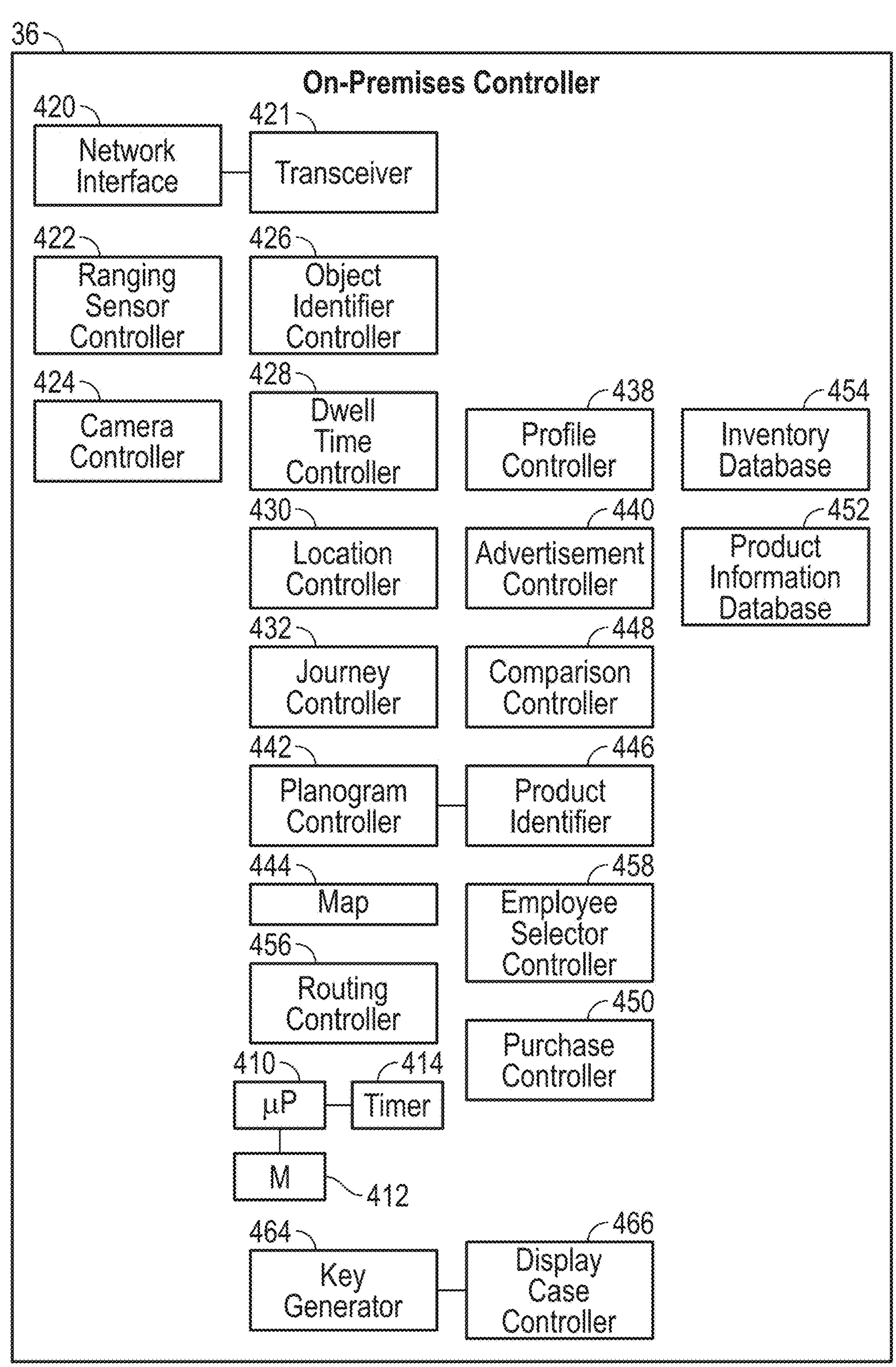
FIG. 4 is a block diagrammatic view of the on-premises controller.

Referring now to FIG. 4, the on-premises controller 36 is illustrated in further detail. The on-premises controller 36 includes a microprocessor 410, a memory 412 and a timer 414. The memory 412 is a non-transitory computer-readable medium including machine-readable instructions that are executable by the processor 410. The machine-readable instructions stored within the memory 412 allow various functions to be performed by the on-premises controller 36 Various functions are described herein and later in conjunction with the flowcharts. The on-premises controller 36 has a network interface 420 and transceiver 421 that are used to communicate to and from various devices through the network 62 illustrated above. The on-premises controller 36 also includes a ranging sensor controller 422. The ranging sensor controller 422 receives ranging signals from the ranging sensors 30 distributed throughout a premises 12. The ranging sensor controller 422 receives ranging signals that originate from the various user devices within the premises 12. The ranging sensor controller 422 may receive several signals from different ranging controllers that have a user identifier corresponding to the user identifier of a particular user device 32. Based upon the signal strengths, the angle of arrival, the time difference between the times of arrival of the radio signal and the like, a location and a direction of travel of the user device 32 within a premises may be determined. The ranging sensor controller 422 may provide various locations ultimately to keep track of the journey 42 within the premises 12. The ranging sensor controller 422 may or may not be able to make extremely precise determinations as to the location of the user device 32. The plurality of cameras 38 may be used to increase the accuracy or supplement the location of the user devices 32. Therefore, a camera controller 424 may also be used to determine locations of the user device 32 within the premises 12. As is illustrated in FIG. 1, the cameras 38 have a certain field of view 38A that may or may not cover every area or zone of the premises 12 completely. The field of view 38A may be blocked or partially blocked in that different perspective angles may prevent a complete view from occurring. Therefore, the ranging sensor controller 422 and the camera controller 424 and the locations determined thereby are complementary to form a more complete determination of the location of all the user devices within the premises 12. The camera controller 424 generates camera image signals that are electrical signals that correspond to camera images generated by the camera or video generated by the camera. The camera signals may be still images or a series thereof or video images both of which are analyzed for the objects therein.

The ranging sensor controller 422 and the camera controller 424, and the signals generated thereby are used by the objector identifier controller 426 to identify objects therein. The object identifier controller 426 may be used to generate objects corresponding to the users and/or user devices. The object identifier controller 426 identifies the objects within an image. A dwell time controller 428 determines the dwell time of the devices from the ranging sensor controller 422 and the camera controller 424. Ultimately, a location controller 430 determines the location of the user device along with a dwell time at each of the locations.

A journey controller 432 determines a journey with the locations and the dwell time of the user and/or user device within the premises. The locations and dwell times form the path or journey 42 which is a time-based sequence. The journey data may be based on at least one of a plurality of locations within the premises, the plurality of locations within the premises and a dwell time at each of the plurality of locations, a walking speed, heading and a comparison of dwell events to purchases The journey may include user-product interactions and various service points within a store such as a pharmacy, optical, and various vending/service machines. An on-premises controller 36 may receive a profile of the user from the profile controller 438. The profile controller 438 may match the user identifier and profile stored within the profile controller. The profile controller 438 allows the advertisement controller 440 to provide targeted advertisements based on user characteristics. The advertisement controller 440 may control the advertisement on the display 58 and or speaker 59 illustrated in FIG. 1. Suggestions may be provided by the advertisement controller 440 based upon various aspects of the location determined by the location controller 430.

A planogram controller 442 provides a product placement identifier in conjunction with a map 444. Products may be associated with various locations by the product identifier 446. Based on the dwell times, products may be recommended by the advertisement controller 440. A comparison controller 448 compares various locations and the products therein. The comparison controller 448 may act in conjunction with a purchase controller 450. For example, based upon the locations visited and the dwell times determined by the dwell time controller and purchases the user purchases as determined by the purchase controller 450, recommendations may be made on-premises for various advertisements to be presented to the user. The product information database 452 may provide specific product information to be advertised to the user. The advertisement controller 440 may not only control the advertisements provided at the display 58. The advertisement controller 440 may also provide data to the display 316 of the user device 32 as illustrated in FIG. 3. The data relative to the dwell time, the locations and the journey of the user device may be communicated to the off-premises controller 80 as described in greater detail below.

The on-premises controller 36 may also be used to provide not only product information from the product information database 452, but inventory amounts from an inventory database 454. The planogram in the planogram controller 442 and the map 444 together with the inventory database 454 allows the user to search for a specific product, obtain product information, locate the product on the map 444 and allow a routing controller 456 to route a user or user device 32 toward the desired product. Should assistance be required by the user, the employee selector controller 458 may be used to allow a retail establishment employee to reach the position of the user device 32. The employee selector controller 458 may use the routing controller 456 and the map 444 to provide instructions to reach the user device in need of assistance. The employee selector controller 458 may also have details as to the expertise of various employees. For example, in a home improvement environment, the employee selector controller 458 may route an employee with knowledge of plumbing to a user device in the plumbing department. In an employee device, the profile may be established for various levels of expertise for various employees. Of course, other functions may be enabled by the on-premises controller including the details provided in the flowcharts below.

A key generator 464 may be used to generate a key used to access the display case 24. That is, when a user device 32 requires access to the display case 24, a key may be provided by the key generator 464 to the user device. The key may be a digital code. The key generator 464 may also provide a key to a display case controller 466. The display case controller 466 receives the corresponding key so that when the user device 32 is brought within a predetermined range of the display case, the display case controller 46 uses the key to unlock the display case. The display case controller 466 may control the locking and unlocking of the display case from the on-premises controller 36 rather than locally at each display case. That is, a control signal may be provided from the display case controller to a locking actuator of the display case 24 to allow access to the display case 34 for the user that presents the key from the key generator 464. The key generator 464 may provide an expiration time for the key. The key may expire or be revoked after use or within a predetermined time period after use.

Figure 5:
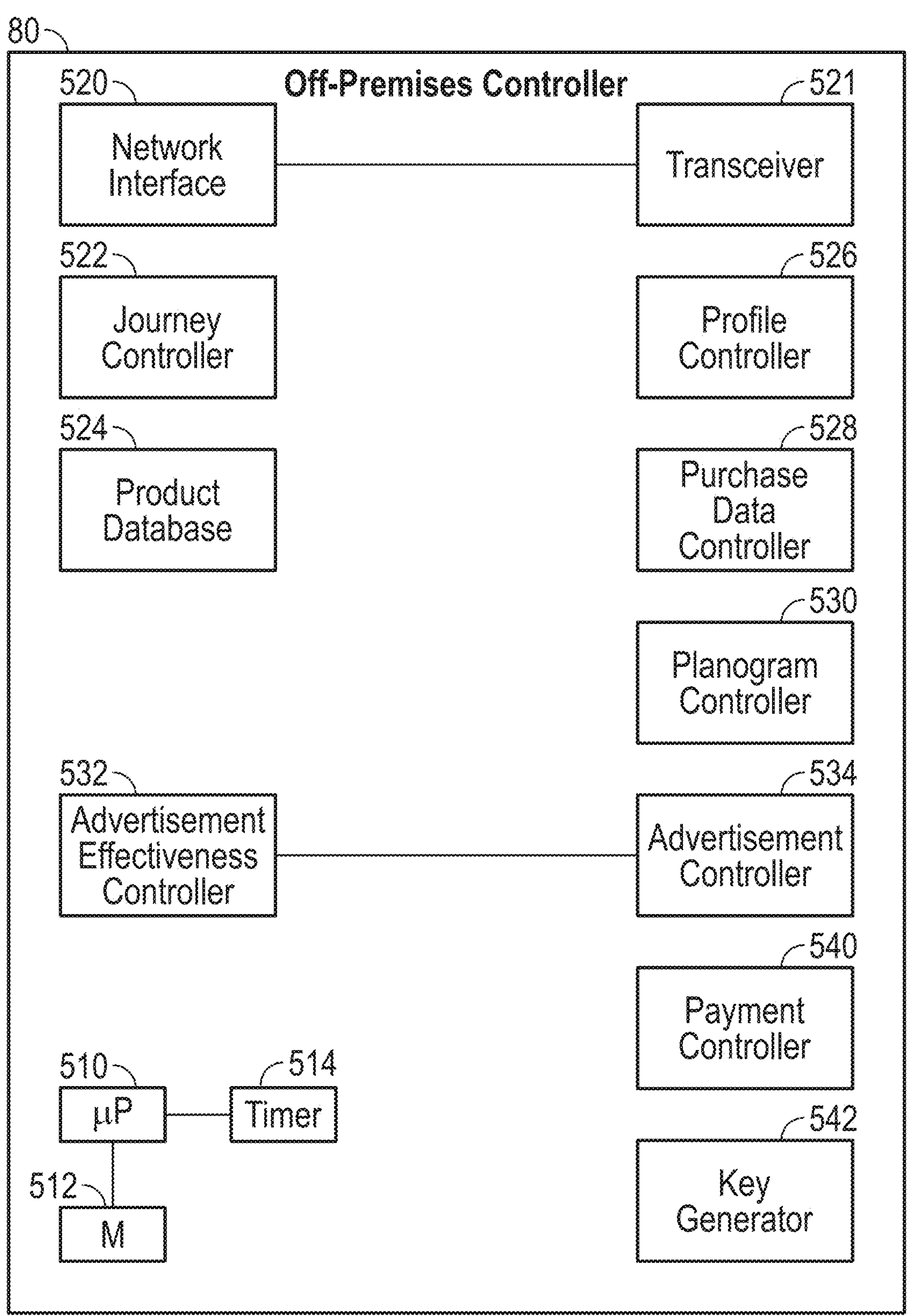
FIG. 5 is a block diagrammatic view of the off-premises controller.

Referring now to FIG. 5, the off-premises controller 80 is illustrated in further detail. The off-premises controller 80 also includes a microprocessor 510, a memory 512 and a timer 514. The memory 512 is a non-transitory computer-readable medium that includes machine readable instructions that are executable by the processor to perform various functions described herein.

The off-premises controller 80 includes a network interface 520 and a transceiver 521 that are used for interfacing with the network 62. As mentioned above, the network 62 may be a wired or wireless network, the network interface 520 may be used for interfacing with one or more different premises or user devices once they leave a premises. For example, one off-premises controller 80 may be used to communicate with a number of different stores throughout a chain of stores.

A journey controller 522 may be used to track the user devices within a premises. The journey controller 522 may provide the tracking based on the locations from the location controller 430, the dwell time controller 428 and the journey controller 432. The journey controller 522 may also be simplified in tracking the journeys from the various devices within various premises.

A product database 524 may also be located on the off-premises controller 80 rather than the on premises controller 36. When product information or data is requested from the user device 32, the product database 524 through the network 62 may provide the data to the on-premises controller 36 or directly to the user device 32 through the network 62.

A profile controller 526 may also be included within the off-premises controller 80. For a retail chain with many stores, the profile controller 526 may store the profiles of the various users in the system including the data associated therewith to allow the users to visit any store and have the same experience. When a user is identified within the premises 12, the profile controller 526 may be contacted by the on-premises controller 36 to receive the information for the associated user. A profile controller 526 may also be used to provide various correlations to various user devices, groups of user devices or target marketing groups of user devices having various characteristics. For example, older users may be provided information regarding products directly to older customers.

A purchase data controller 528 may aggregate purchases for each premises 12 The aggregate of the purchase data allows various trends in consumer tastes to be determined, correlations to be made between product placement and the popularity of various products. The planogram control 530 can correlate the purchase data from the purchase data controller 528, the location dwell time and journey of various user devices as determined or received at the journey controller 522 to allow planogram changes to be recommended from the planogram controller 530.

An advertisement effectiveness controller 532 together with an advertisement controller 534 may be used to control various advertisements that are communicated to a user device. As will be described in greater detail below, advertisements may be provided during the shopping experience. However, once the user device leaves the premises, further ads may be communicated to the user device from the off-premises controller 80 based on different data regarding the user. The ads may allow retargeting advertisements based upon various characteristics. For example, when a user dwells at a particular area without buying a product (as determined by the purchase data controller 528), the advertisement controller 534 may generate advertisements corresponding to the unpurchased products. However, when a product is purchased after a long dwell time at a location, advertisements may not be provided to the user device after leaving the premises.

The advertisement effectiveness controller 532 may receive data from the purchase data controller 528 as to the effectiveness of various advertisements within or outside the premises. The advertisement effectiveness controller 532 may assess the effectiveness of advertisements provided in the store by determining whether advertised products have been purchased after a targeted advertisement. The advertisement effectiveness controller 532 may also be used off-premises. When advertisements are provided to a user off-premises, when a product is purchased that was advertised off-premises, the next time the user enters the store, the advertisement will be deemed effective. The advertisement effectiveness controller 532 and the advertisement controller 534 may be programmed to prevent repeating advertisements in a repetitive manner.

A payment controller 540 may be used to control the payments for a user. Together with the user profile, the payment controller 540 may provide credit card or bank account information to the on-premises controller when the user device 32 and the user associated therewith is purchasing products at the point-of-sale device or otherwise.

Figure 6:
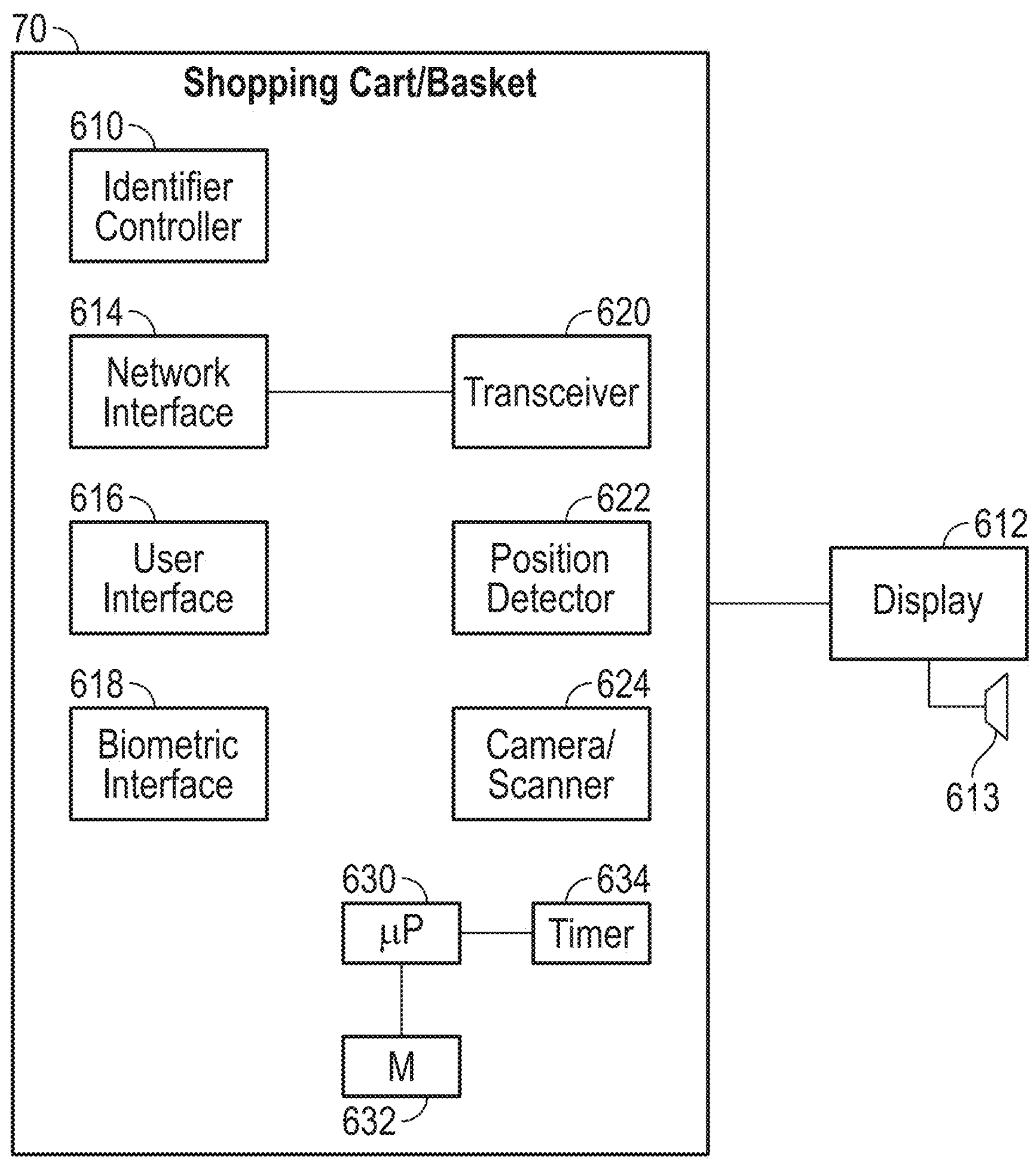
FIG. 6 is a block diagrammatic view of a shopping cart or basket.

Referring now to FIG. 6, the shopping cart or basket within the store may also be a smart device which may become a type of user device because it may be associated with a user during a shopping experience. Electronics may be coupled thereto to provide identification of a user. The features of the shopping cart or basket 70 may be less than that of a user device 32 in that personal details may not be provided. However, an identifier controller 610 may be used to communicate an identifier corresponding to the shopping cart or basket 70 to the ranging sensors 30. Therefore, the shopping cart or basket 70 may be tracked. The shopping cart or basket 70 may also have a display 612 and a speaker 613 associated therewith. The display 612 and or the speaker 613 may provide or display purchase data, product information and the like.

A network interface 614 interfaces with the network 62 of the premises to allow the advertisements and intercommunication with the on-premises controller 36. A user interface 616 may be provided to allow a user to input various data including making selections and moving through various advertisements on the display 612. The user interface 616 may be a plurality of buttons or virtual buttons on the display 612 when the display 612 is a touch screen display. A biometric interface 618 allows biometric data to be provided therethrough. The biometric interface 618 may allow fingerprinting or facial recognition to be used to identify a user. Ultimately, the user interface 616 and the biometric interface 618 allow a user to identify with the shopping cart or basket 70 which may act as a user device described above in identifying the user. The network interface 614 may allow a user profile to be used from a profile controller to allow target ads and other information to be used by the shopping cart or basket. The network interface 614 through the transceiver 620 allows two-way communication with the network.

A position detector 622 communicates with the ranging device to provide position data to the ranging devices and ultimately to the on-premises controller 36. A camera/scanner 624 allows various products to be scanned when placed within the shopping cart or basket 70. Therefore, the camera/scanner 624 may be used to inventory the cart and allow a user to pay without a cashier. After paying, the user interface 616 may be used to remove any identifying information from the shopping cart.

The shopping cart or basket 70 includes a controller microprocessor 630, a memory 632 and a timer 634. The microprocessor 630 may be referred to as a processor. The microprocessor 630 together with the memory 632 controls various functions. That is, the memory 632 is a non-transitory computer readable medium that includes machine-readable instructions that are executable by the processor to perform the various functions.

Figure 7:
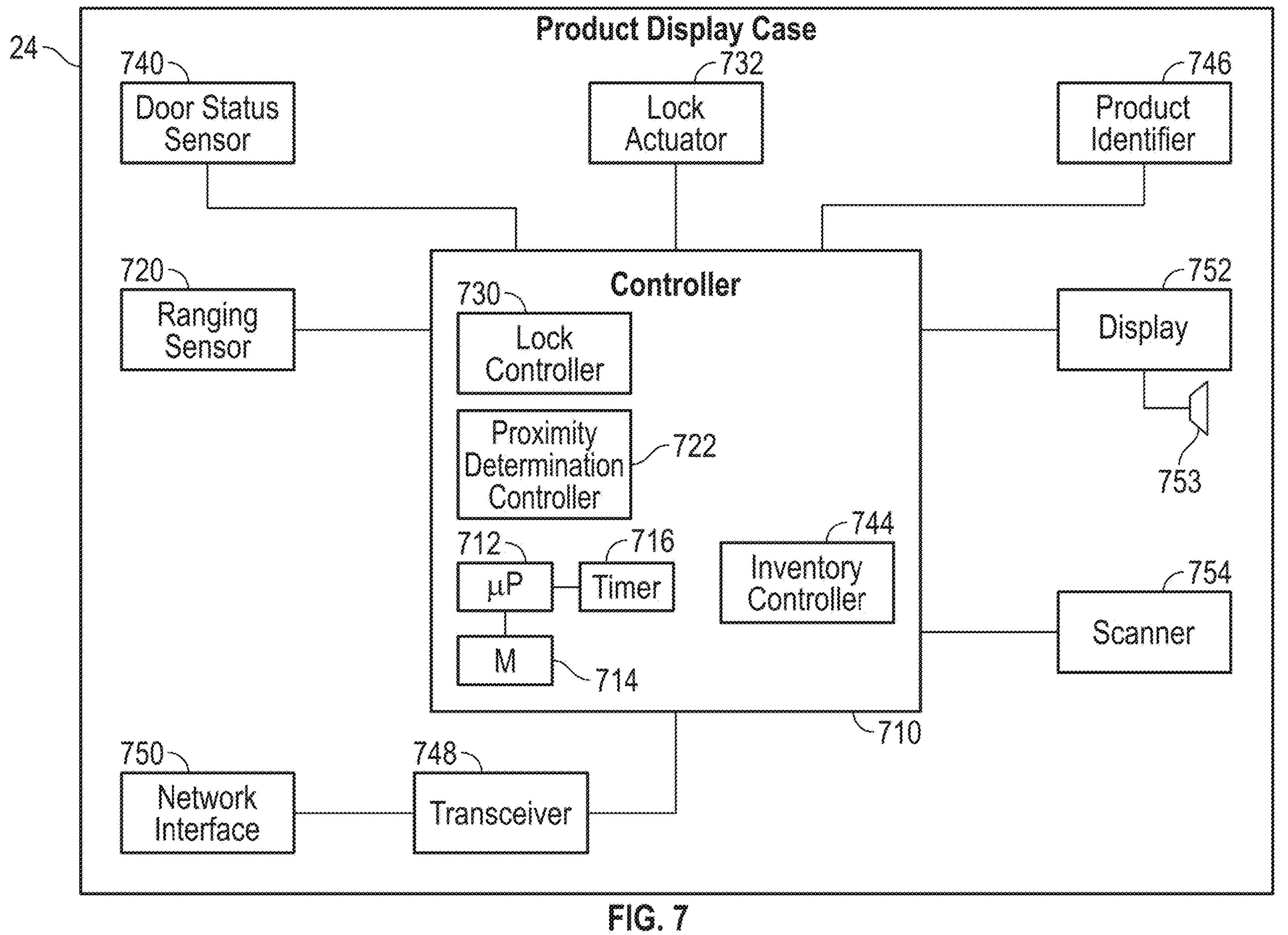
FIG. 7 is a block diagrammatic view of a product display case.

Referring now to FIG. 7, further details of the display case 24 are set forth. The display case 24 includes a controller 710 that has a microprocessor 712, a memory 714 and a timer 716. The microprocessor 712 may be referred to as a processor. The microprocessor 712 together with the memory 714 controls various functions. That is, the memory is a non-transitory computer readable medium that includes machine-readable instructions that are executable by the processor to perform the various functions. The various functions relative to the product display case allow inventory control, access control and the like. The controller 710 may be coupled to a ranging sensor 720. The ranging sensor 720 may act as a ranging sensor 30 described above. However, the ranging sensor 720 may be incorporated into the display case 24. The ranging sensor 720 allows the proximity to be determined by the proximity determination controller 722. When the user device is very close, as is determined by design, a lock controller 730 may be used to control a lock actuator 732. The lock actuator 732 may be latched and unlatched by control of the lock controller 730. The lock controller 730 may unlatch the latch actuator 732 when the key generated by the on-premises controller 36 or the user device 32 match. The lock may be locked by the lock actuator 732 and the controller after a time period timed by the timer times out. Likewise, the lock actuator 732 may be controlled after the lock is unlocked or locked if the door is not opened after a time period.

A door status sensor 740 provides a door status symbol to the controller 710. The door status sensor may provide an open signal, a closed signal or signals that correspond to a transition between the open and closed state or a closed and open state. The door status sensor may be used together with an inventory controller 744 and a product identifier 746 to determine the inventory within the product display case. That is, the inventory controller 744 may generate or count the products within the display case prior to opening the display case. The product identifier 746 may be an RF identifier that energizes and receives signals from tags on the products within the display case 24. Prior to opening a display case may determine the inventory. After the door opening, a second inventory may be determined and the inventory controller 744 may communicate the change in inventory through an RF transceiver 748 and a network interface 750. In this manner, the user account may be charged. The transceiver 748 may be used to communicate with user devices directly through short range communications such as Bluetooth or indirectly through the network 62. The transceiver 748 also communicates with the on-premises controller 36 or the off-premises controller 80. The product display case 24 may also include a display 752 and a speaker 753. The display 752 and speaker 753 may be used to communicate instructions and/or communicate advertisement data to a user. For example, a display case 752 and/or a speaker 753 may instruct a user to communicate a key or move the user device closer so that a key is communicated. The display 752 and/or the speaker 753 may generate instructions for opening the case or that the key has been received successfully. The display 752 may also generate warnings including that the customer is responsible for all items removed and prevent unauthorized/unverified shoppers nearby from accessing the product display case.

A scanner 754 may also be incorporated into the product display case. The scanner 754 may be a bar code scanner or an RF ID scanner. The scanner 754 may be actuated by the opening of a display case door or switch electrically couple thereto.

Figure 8:
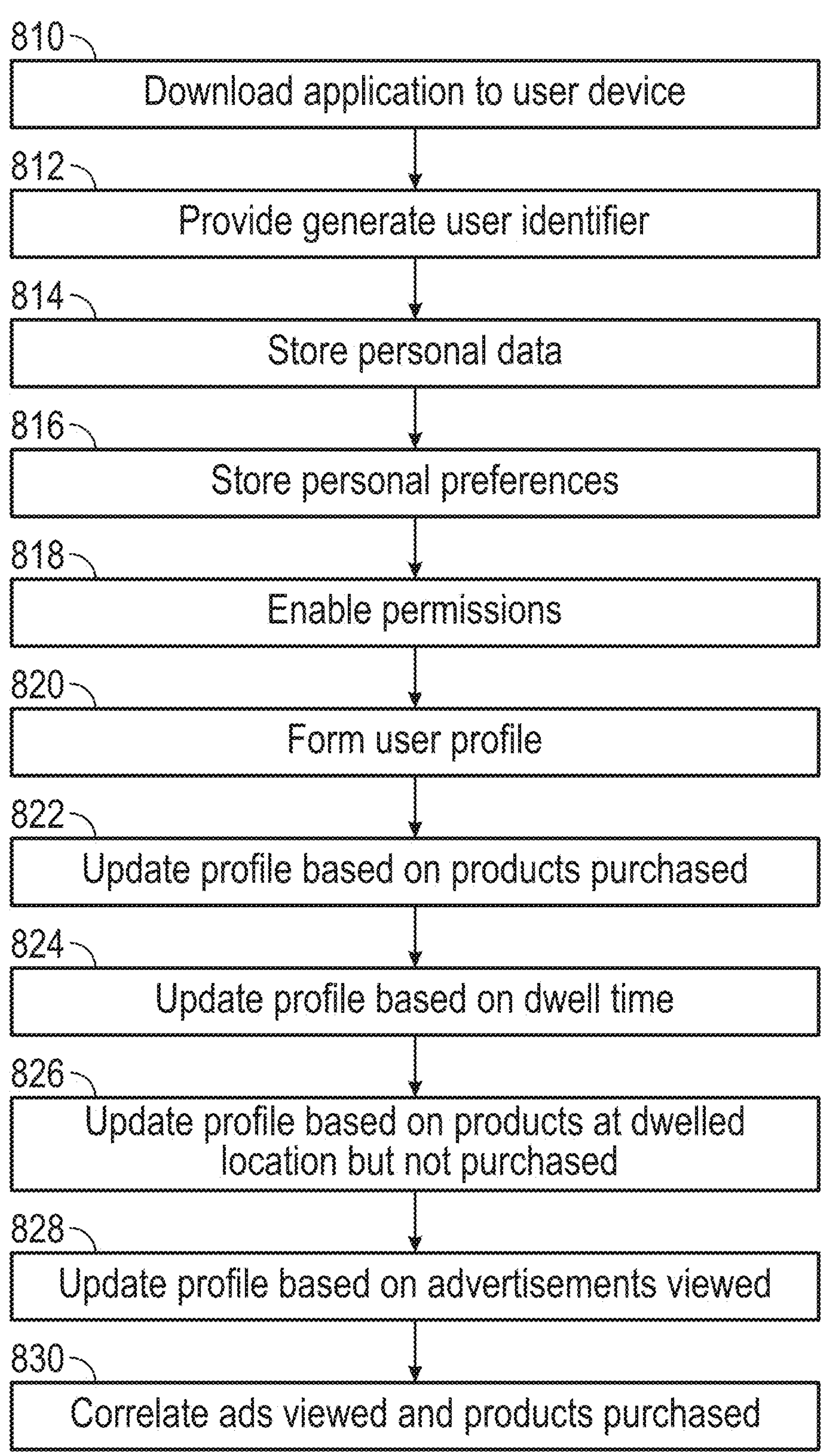
FIG. 8 is a flowchart of a method for establishing a user profile.

Referring now to FIG. 8, a method of generating a user profile is set forth. In step 810, an application is downloaded or saved within the user device. A user identifier is generated in step 812. The user identifier may be generated by the user as a login name. Likewise, a password may also be saved to allow login into the device. A user identifier may be randomly generated by an alphanumeric identifier generated at the user device to identify the user device during operation. Thus, step 812 may have more than one purpose generating login credentials and for identifying the user device during operation.

In step 814, personal data is stored within the user profile. Personal data such as name, address and contact information may be provided as personal data. Personal data may also include user characteristics such as body type, medical conditions, allergies, food preferences, religious preferences and the like.

In step 816, personal preferences may also be asked including different brands and the like. In step 818, various permissions may be obtained. Permissions, such as access to a camera, communicating through Bluetooth or other short range wireless signals and the like may be provided.

In step 820, a user profile is formed with the data provided in steps 812-816. The user may provide various data to the user device through the user interface. Biometric data and the like may also be provided through the user interface, the camera or the like. In a mobile device, the facial recognition and fingerprint recognition may already be present on the device and thus may be allowed to enable the application.

In step 822, the user profile may also be based on the products purchased. That is, the user profile may be stored on an off-premises device, an on-premises device or on the mobile device. In all situations, the user profile may be updated based upon the products purchased.

In step 824, the dwell time and products around the user when traversing a premises may be recorded. That is, the products around a location where the user device is located for a specific amount of time or dwell time may be also used to update the profile. In step 826, the profile may be updated based on products at the dwell location but not purchased. That is, when a user dwells at a location and purchases the product, the user profile may be updated accordingly. However, advertisements may not be provided when products were purchased after a long dwell time at a particular location.

In step 828, the profile may also be updated on advertisements viewed. Advertisements provided to the user device or displayed at displays, such as display 58 and speaker 59 in FIG. 1, may be used to update the profile. This allows repeated advertisements to be prevented or delayed for some time.

In step 820, correlation may be formed between the advertisements viewed and the products purchased. When there is a correlation, the user profile may be updated. For example, when the user purchases a particular product after an advertisement, the user profile may be updated for the user liking certain products. However, when the user just purchased products, advertisements may be delayed so that interest may be generated in other products.

Figure 9:
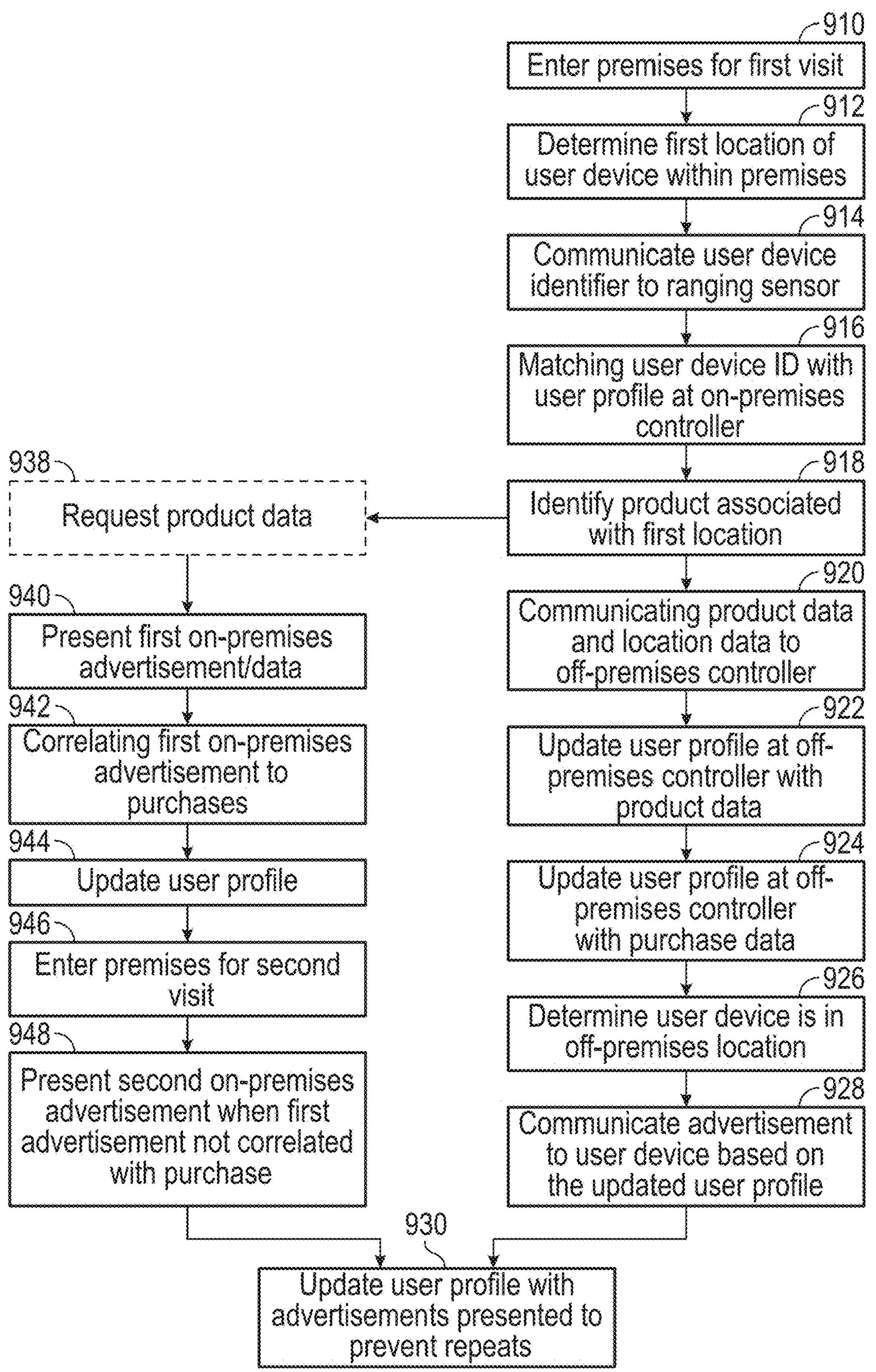
FIG. 9 is a flowchart of a method for providing advertisement to a user device.

Referring now to FIG. 9, a method for providing advertisements to a user device is set forth. In step 910, the user enters the premises for a first visit. Entering the premises may be detected by a ranging sensor 30, a camera 38 or both. Likewise, other sensors on the mobile device, such as a global positioning sensor, may be used to determine the entering of a premises.

In step 912, the location of the user device within the premises is tracked. The ranging sensors 30 and the cameras 38 may track the user device within the premises. Also, the user may be tracked by either the ranging sensor or the camera when one of the two is not available. Further, because the cameras exist, the tracking and identification of the user may also be performed, for example, when the user device is left in a shopping cart. When the user device is left in a shopping cart and the user walks away, the camera signals may be prioritized over the ranging signals to determine user location. In step 914, the user device identifier is communicated to the ranging sensor. The images are used to classify shoppers local to a camera of a known location. Ultimately, the images are used to classify user-product interactions, and update a profile based on the user-product interactions. In step 916, the user device identifier and the profile associated therewith are updated at the on-premises controller. The products around the user and the interactions may be used to update the profile.

When the user device is a device not logged into an application or not specifically belonging to a user such as a shopping cart this step is optional. In step 918, a product associated with the first location is identified. The product may be identified by correlating the location with the planogram and map of the premises. In step 920, the product data and the location data are communicated to the off-premises controller. In step 922, the user profile is updated at the off-premises controller with the product data. When the user purchases products, the user profile is updated at the off-premises controller with the purchase data. In step 926, the user device location being off-premises is determined. In step 928, an advertisement is communicated to the user device based on the updated user profile. Various types of advertisements for various locations visited may be provided. The dwell times and other journey data may be considered when determining the advertisement. In step 930, the user profile is updated with advertisements presented to the user profile and prevents repeat advertisements from being provided to the user device. In summary, advertisements may be provided to the user device after the user device has left the premises and may be based on prior actions and the user profile of the user.

Referring back to step 918, after the product is identified that is associated with a first location. Advertisements or product data may be automatically presented or requested by the user as shown in optional step 938. In step 940 a first on-premises advertisement or product data may be presented to the user device. The first on-premises advertisement or data may be presented automatically on the user device or display, such as the display 58 and/or speaker 59, within the premises which are controlled by the on-premises controller. After step 940, step 942 correlates the first on-line premises advertisement to purchases. The user profile is updated in step 944 that shows a correlation between the purchases and the advertisement presented in step 940. When the user device does not belong to a user or the application is not active (as per Step 916), the presentation of a rewards card will allow association of the purchased products to the user and user profile. In step 946, when the user, along with the user device, enters the premises for a second visit, step 948 presents a second advertisement that is different than the first advertisement when the first advertisement does not correlate with a purchase. The point of sale device may communicate products purchased to the on-premises controller and therefore a comparison may be made between the products in the advertisements and the products purchased. Advertisements for other products may be provided when the first product was not purchased. The advertisements may be for related products. Related products may be similar products, products in the same field, or products used together with the first product. After step 948, step 930 may be performed in which the user profile is updated with the advertisements presented to prevent repeat of advertisements.

Figure 10:
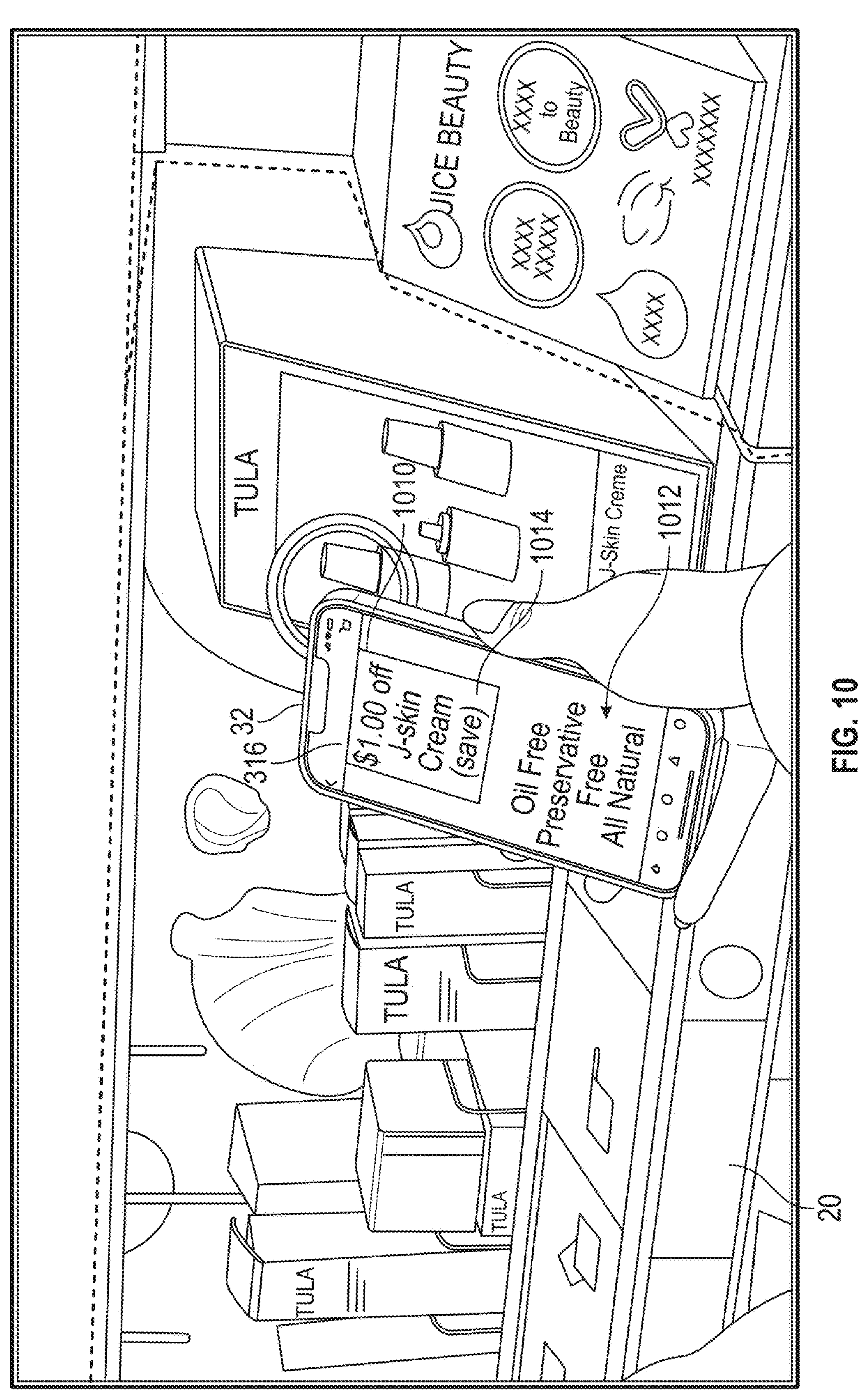
FIG. 10 is a diagrammatic view of a user device relative to a shelving unit with an offer and information regarding the products.

Referring now to FIG. 10, an example of microlocation and an advertisement is set forth on the user device 32. The user device 32 has the display 316 that is adjacent to "J-Skin Crème". The microlocation is determined by the cameras 38, the ranging sensors 30 or both. The advertisement may be the advertisement set forth in FIG. 9 at step 928 or the advertisement at step 948. In this example, the advertisement has a coupon 1010 and product data 1012. A "save" button 1014 may also be provided on the screen so that the advertisement is saved within the memory 352 of the user device or together with the user profile in the on-premises controller or the off-premises controller.

Figure 11:
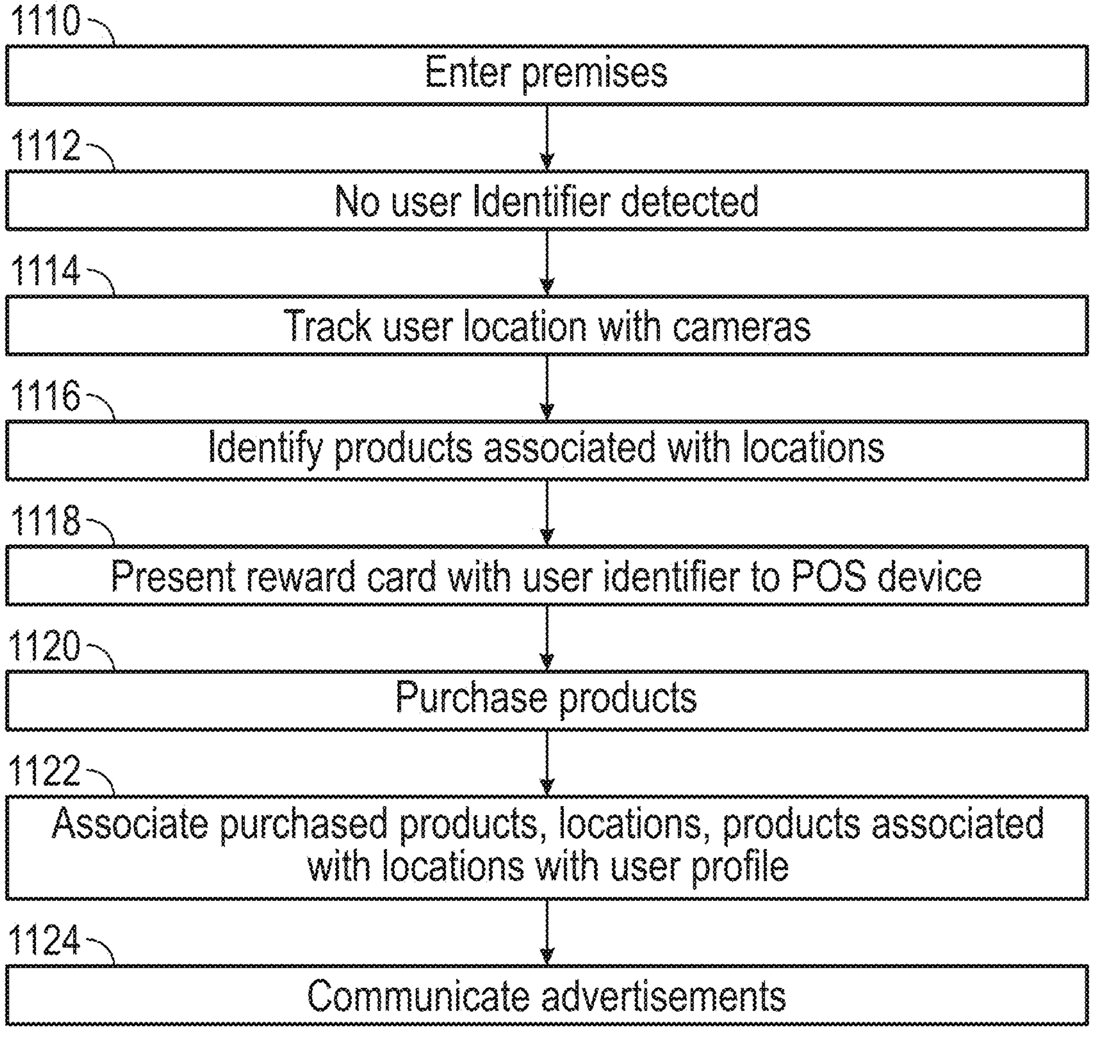
FIG. 11 is a flowchart of a method for updating a profile.

Referring now to FIG. 11, a method for updating a user profile when a user device is not used. In step 1110, the user 40 enters the premises 12. In this example, the ranging sensors are of no use because no user device is provided. Entry into the premises is determined by the cameras 38. In step 1112, no user device is therefore detected because no user device is provided by the user. In step 1114, the user locations may be tracked with the cameras 38. In step 1116, the products associated with the various locations and the dwell times associated with the locations may be used to identify products relative to the planogram.

In step 1118, the user presents a reward card with a user identifier or bar code to the point of sale device upon checkout. In step 1120, the user purchases the products at the point of sale device. In step 1122, the purchased products, the location and the products associated with the locations that the user traveled are associated with the user profile that is associated with the identifier card. In this manner, the user profile is updated. Optionally, if the user uses a computer or a user device off-premises or next visit on store premises, advertisements may be communicated to the user at step 1124. Advertisements may be communicated from the off-premises location.

Figure 12:
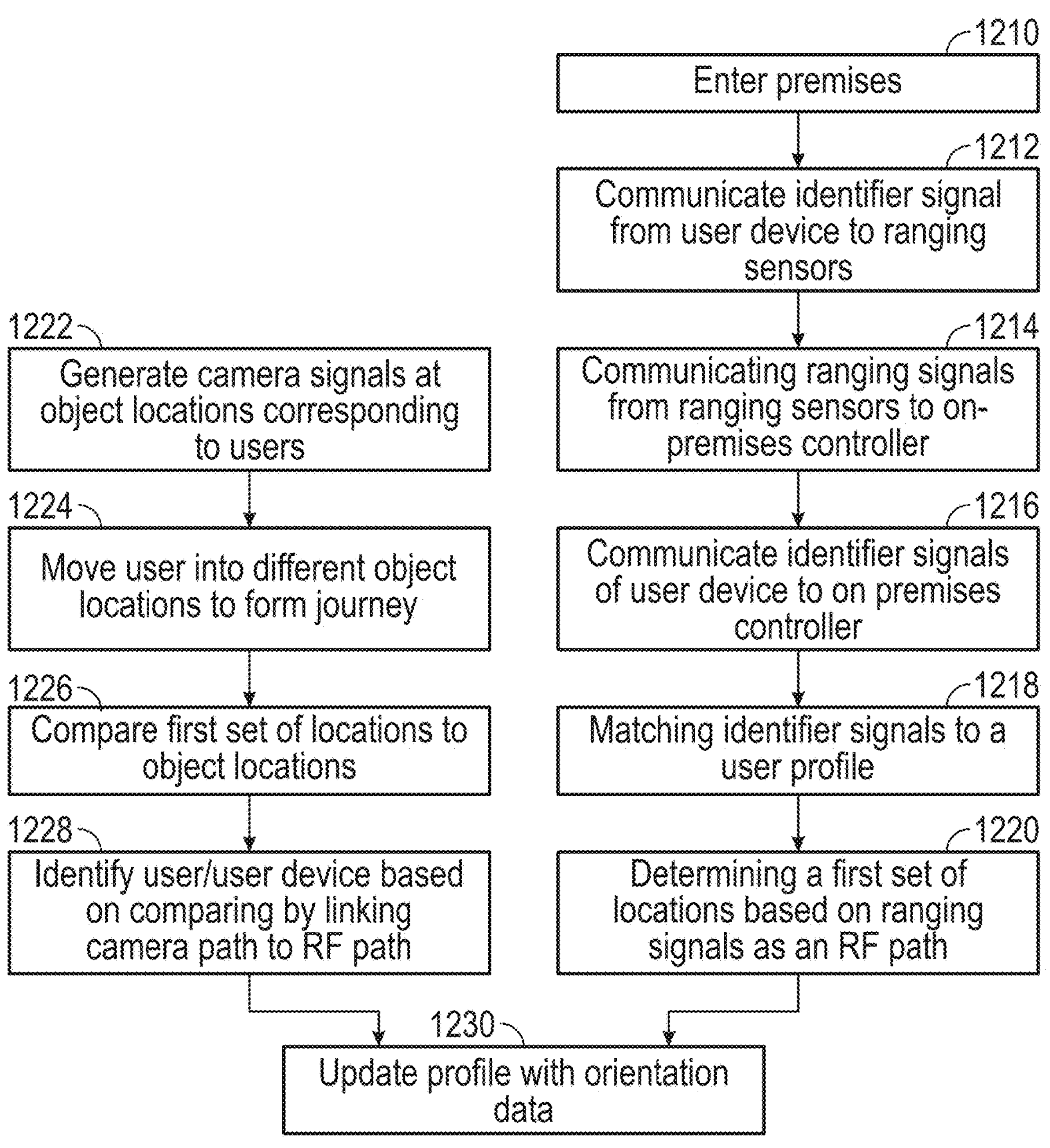
FIG. 12 is a flowchart of a method for using both a camera path and an RF path for identifying a user device.

Referring now to FIG. 12, a method of determining the user location using cameras and the RF sensors is set forth. In step 1210, the user enters the premises. In step 1212, the user device communicates an identifier from the user device to the ranging sensors. In step 1214, the ranging signals are communicated from the ranging sensors to the on-premises controller. In step 1216, the identifier signals are communicated from the user device to the on-premises controller through the Wi-Fi. In step 1218, the identifier signals are matched to the user profile at the on-premises controller. In step 1220, a first set of locations based on the ranging signals are determined as an RF path.

In step 1222, the camera signals are used to detect objects at various locations corresponding to users. The cameras signals may be used to determine and track the users. In step 1224, the user moves into different object locations to form a journey. That is, the camera signals, whether video or still images, have objects that move and therefore various objects may be considered as being users or user devices. In step 1226, the first set of object locations is compared to the object locations of the camera. After step 1220 and 1228, the user is identified by comparing the locations in the camera path to the locations in the RF path. That is, the object locations from the camera signals are compared to the object locations from the RF sensors. By linking the camera path and the RF path, the user device can be precisely identified along with the user. This may be specifically important when an unconnected user device is used. Although the user device is not connected per se, Bluetooth may be enabled. Bluetooth® may broadcast with identifiers that change over time. Therefore, as the user device moves the cameras may track the device at the transition from one identifier to another to allow continual identification. In step 1230, the user profile may then be updated with orientation data from the camera images and/or the sensors provided on the user device. This will allow the system to identify precisely the products that may interest the user of the user device.

Figure 13:
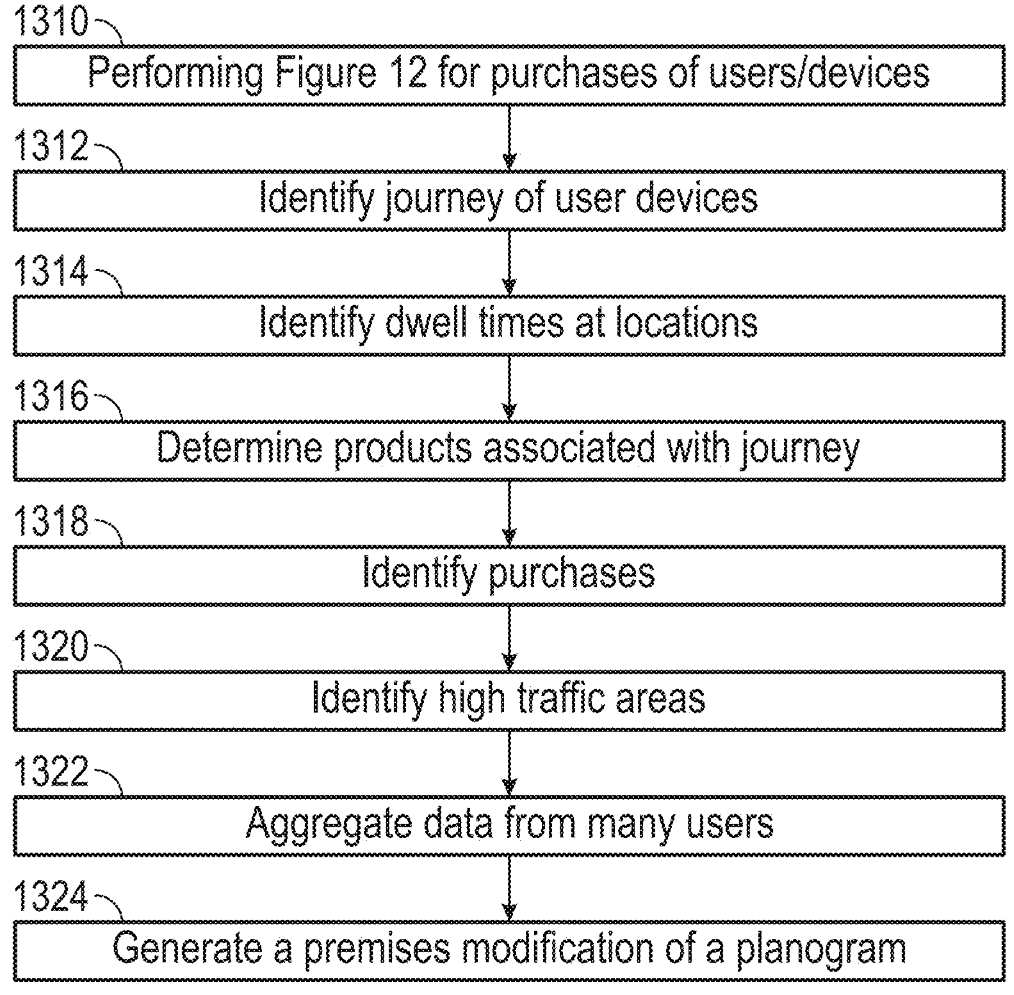
FIG. 13 is a flowchart of a method for updating a planogram of a premises.

Referring now to FIG. 13, the data from FIG. 12 may also be used to generate a modification of a planogram. In step 1310, the steps of FIG. 12 are performed for a plurality of user devices. That is, the precise paths that the user devices traverses through the store as well as the dwell time to determine the products that the user is interested in as well as the products that are purchased. In step 1312, the journey associated with each of the user devices is saved in the on-premises controller 36. The dwell times and various locations are also determined. In step 1316, the products associated with the journey of each of the user devices are determined. In step 1318, purchases are also determined.

High traffic areas are determined from the above data in step 1320. That is, the purchases, the journey, the products associated with the journey as determined by the dwell times is used to identify high traffic areas with the premises. Based on the aggregate data from many users in step 1322, step 1324 generates premises modifications of a planogram.

Figure 14:
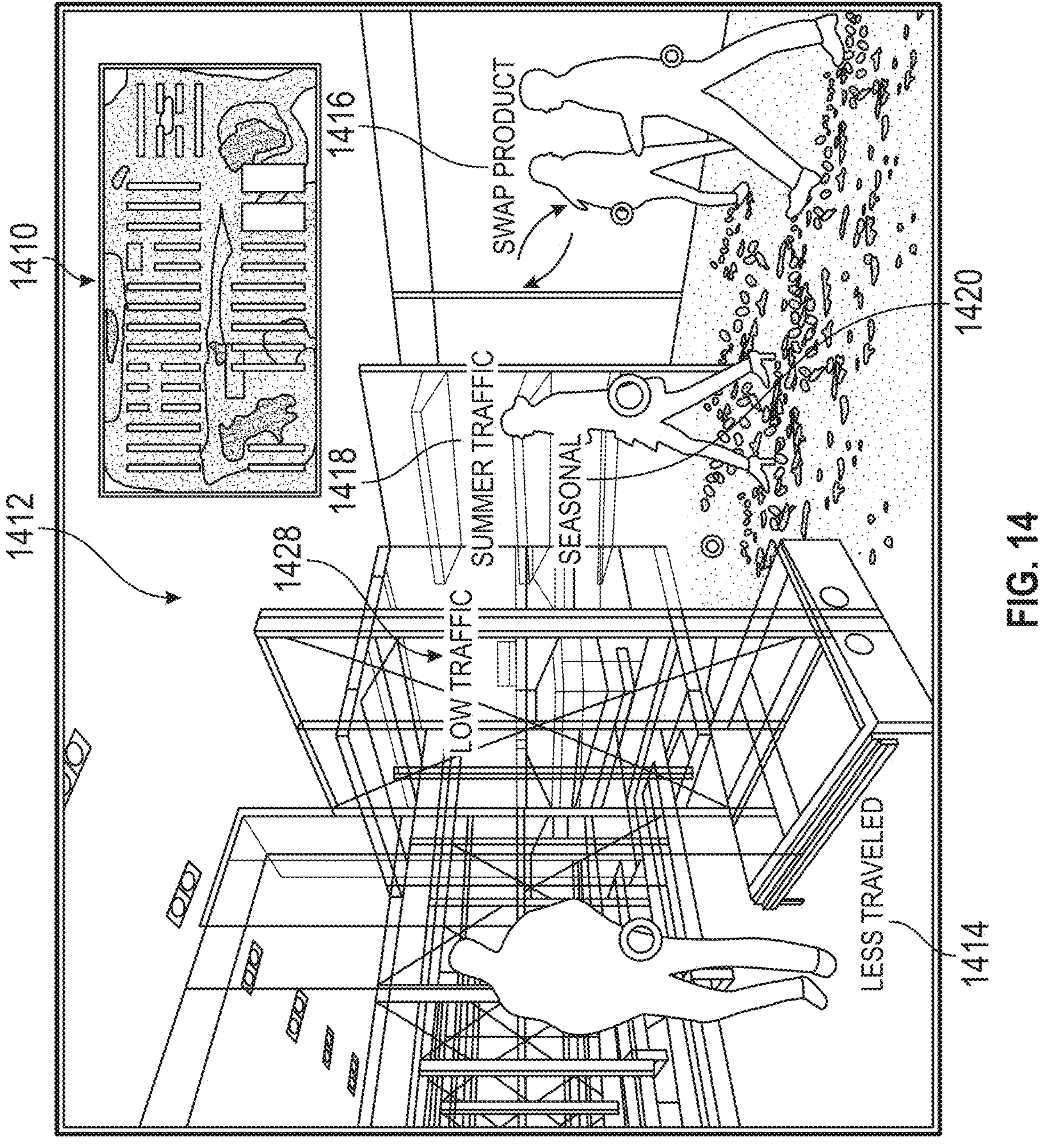
FIG. 14 is a layout of a screen display for modifying a planogram.

Referring now to FIG. 14, a planogram 1410 is illustrated with a perspective view 1412 of the premises layout. A portion of the planogram 1410 is illustrated in the perspective view 1412. In this example, various labels such as "less travelled" at 1414 and instruction at 1416 for swapping a product location, and other indicators such as the summer traffic at step 1418, seasonal products at 1420 and low traffic at 1422 are identified. The labels on the screen display of the perspective view provide the premises operators suggestions as to how to change and make modifications to a planogram. Of course, lists of changes in text form may also be generated instead of or in addition to the screen display. The planogram is a diagram or model that indicates the placement of retail products on shelves. The goal of the retailer is to maximize sales with a planogram and rearrange products as needed.

Figure 15:
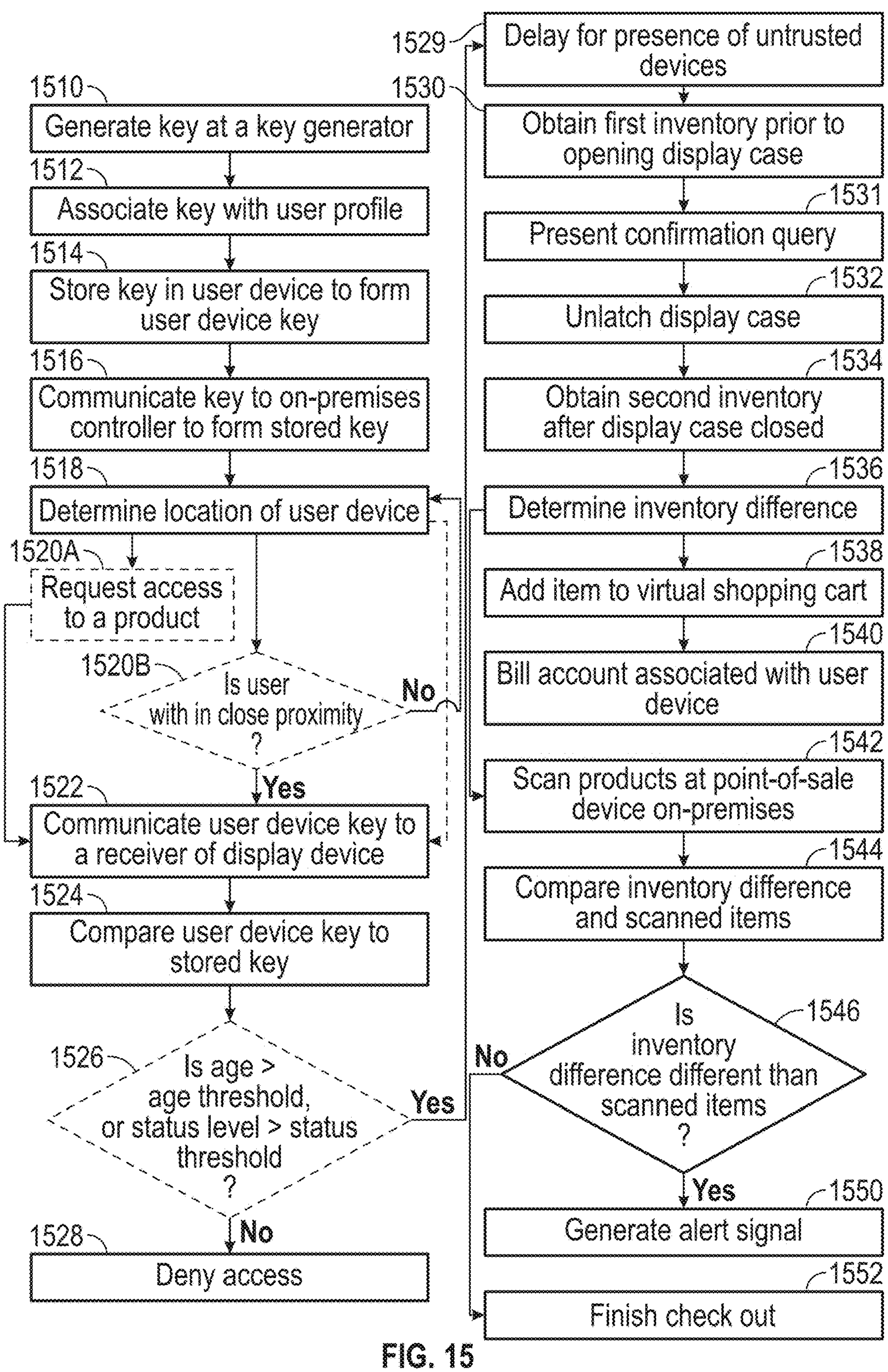
FIG. 15 is a flowchart of a method for providing products from a display case.

Referring now to FIG. 15, a method of providing products through a secured display case is set forth. In step 1510, a key is generated at a key generator. The key generator, as described above, may be located in the user device, the on-premises controller or the off-premises controller. In step 1512, the key is associated with a user profile. The key may be requested prior to entering a premises or may be located within a premises. The key may also be established at the time the user profile is generated when first signing into the application. In step 1514, a key is stored in the user device to form a user device key. In step 1516, the key is communicated to the on-premises controller to form a stored key. These steps may be reversed when the key is generated at the on-premises generator and stored in the user device. In step 1518, the location of the user device is determined. As mentioned above, cameras and the ranging sensors may be used alone or together to determine the precise location of the user device. After step 1518, optional steps may be performed. That is, access to a product may be requested in step 1520A. After step 1518, an optional step 1520B may also be performed instead of 1520A. That is, step 1520A determines if the user is within a close proximity to the display case. Close proximity may be within or less than a predetermined distance such as 2 feet. Of course, the distance threshold of 2 feet may be increased or decreased depending upon the design considerations. When the user is not within close proximity (less than a distance threshold), step 1520 is repeated. Steps 1520A and 1520B are optional steps after which step 1522 is performed. Step 1522 may also be performed directly after step 1518. In step 1522, the user device key is communicated to a receiver or transceiver of a display device. In step 1524, the user device key is compared to the stored key at the display device. Optionally, this step may be eliminated if the user device key is communicated to the on-premises controller for comparison at the comparison controller 448.

In step 1526, there may be restrictions on accessing the display case. As mentioned above, there may be an age threshold, or an authentication level threshold associated with a display case. The age threshold may be limited for products such as state restricted products like alcohol or cigarettes. The status memory 356 and the age memory 368 of FIG. 3 may be used for the age and status of the user which is stored in the user profile. When the age is not greater than the age threshold or the authentication level is not greater than a status threshold, access may be denied in step 1528. After step 1524 or when step 1526 in which the age is greater than an age threshold or an authentication level is greater than a status threshold, the system determines the presence of untrusted devices nearby and may initiate a time delay or wait until there are no or few untrusted devices nearby. A user device may become untrustworthy for many reasons including leaving cases open and returning products too many times. Step 1530 obtains the inventories prior to opening the display case. The display case inventory may be obtained when the last opening has taken place or after a restocking as well. The first display case inventory is obtained prior to opening at step 1530. A confirmation query may be presented to the user through the user device to confirm that the intent is to open the display case and that the user is responsible for all items removed. For example, intent may be established when a phone is touching or within a small distance from the handle. An RF signal such as Bluetooth® or a near filed communication may be exchanged between the user device and the display case. To prevent theft, the application controlling the shopping experience may be required to be active. If the user device enters a sleep mode, the communication signal for providing intent may be stopped. A reminder may be presented to close the door and make sure it is secure before leaving the display case. In step 1532, the display case is unlatched to allow opening of a door to access the products therein.

In step 1536, a second display case inventory is determined after the display case is closed. That is, a product identifier 746, such as an RF device, may be used to read the tags before and after to obtain the inventories. In step 1536, an inventory difference is provided. After step 1536, step 1538 may add the inventory difference items to a virtual shopping cart. In step 1540, the account associated with the user device may be billed. The payment terms may be provided on the establishment of a user profile. Of course, other payment methods may be obtained or queried during this process. Alternatively, after step 1536, step 1542 is performed in which the user "checks out" of the premises. In step 1542, the user or a cashier scans the products at a point-of-sale device on the premises. After step 1542, step 1544 compares the inventory difference to the scanned items. In step 1546, if the inventory difference is different than the number of scanned items, an alert signal is generated in step 1550. An employee may provide assistance based upon the alert signal. In step 1546, when the inventory difference is not different than the scanned items, the check-out process is finished in step 1552. In step 1552, the completion of the checkout process allows a payment to be made to the store for the items that are being purchased.

Figure 16:
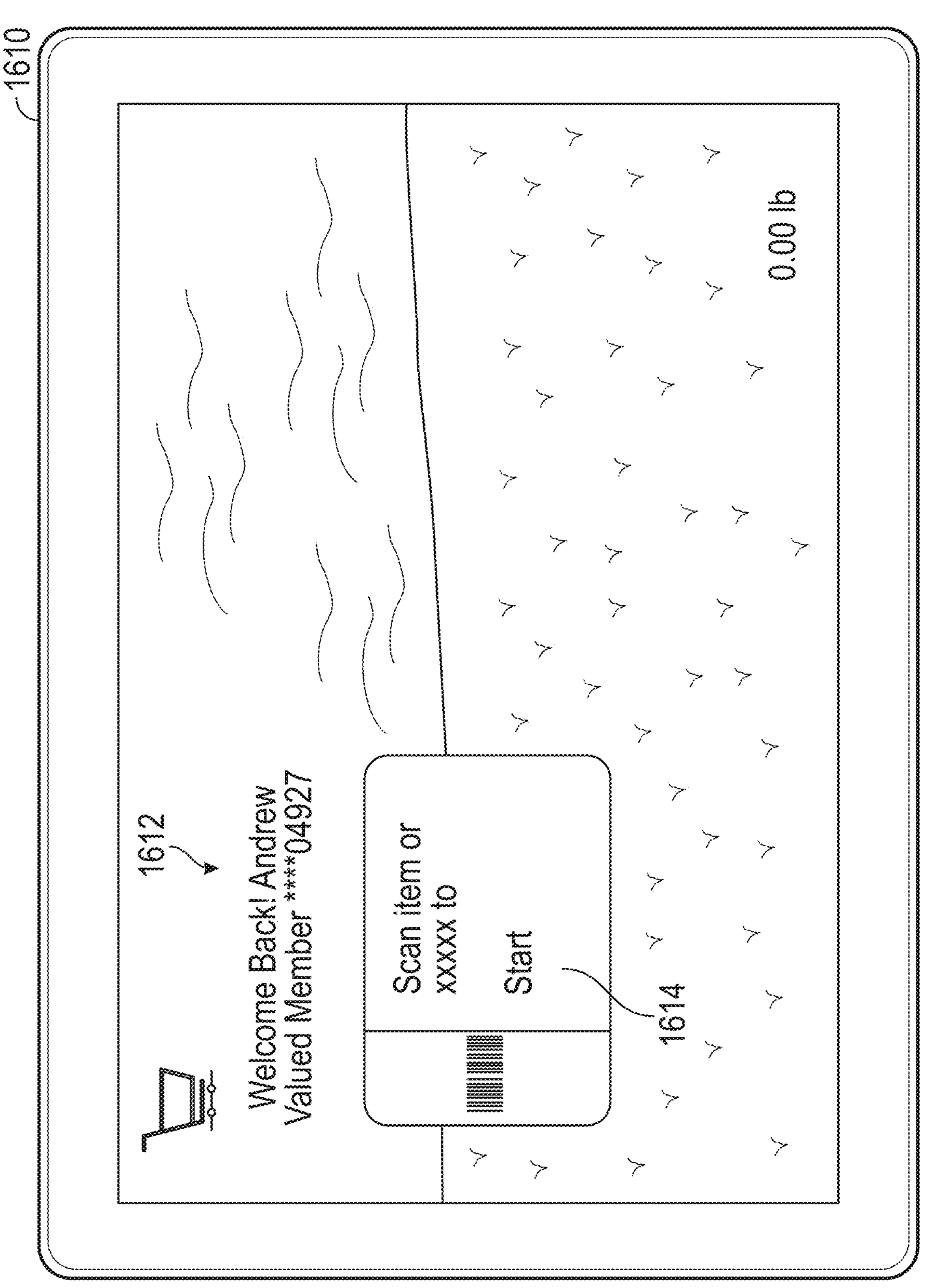
FIG. 16 is a screen display for a point-of-sale device that is customized for the user.

Referring now to FIG. 16, an example of a screen display for a point-of-sale device is illustrated. Because the identity of the user and user profile is known, a customized message 1612 may be provided. The user may be identified by communicating signals to the point-of-sale device using short range communications such as near-flied communications or scanning a reward card (virtual or physical), or identity card that identifies a user. In this example, the point-of-sale system knows that "Andrew" is the user in the personalized message 1612. The point-of-sale device may instruct the user to perform various functions including starting the scanning process by the message 1614.

Figure 17:
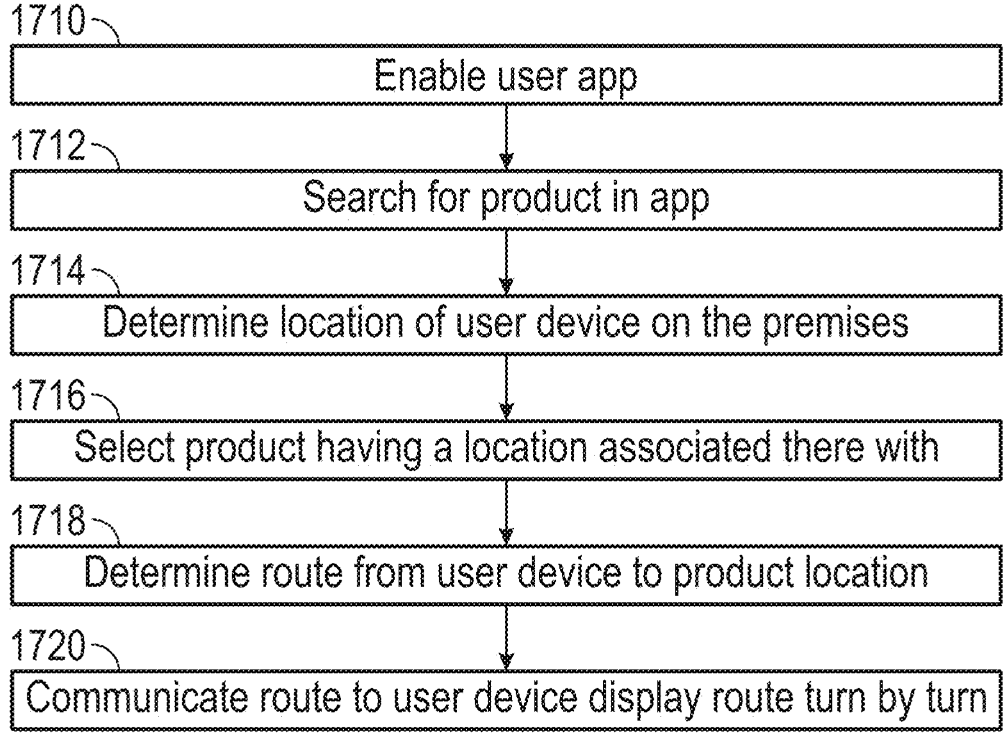
FIG. 17 is a flowchart of a method for routing a customer to a product.

Referring now to FIG. 17, a method for routing a customer or user to a product is set forth. In step 1710, a user application is enabled. In step 1712, the product desired is searched for within the application. In step 1714, the location of the user device on the premises is determined. The location of the product may be determined from the planogram controller 1442 and the map 1444. In step 1716, the product having the location associated therewith is selected by the user from the app. In step 1718, the router controller 456 may determine a route from the user device to a product location within the premises. In step 1720, the route may be communicated to the user device through the network 62 and the route may be displayed either audibly or visually to the user so that the products may be easily located. Aisle numbers, bin numbers and shelf numbers may be provided at the end of the turn-by-turn routing.

Figure 18:
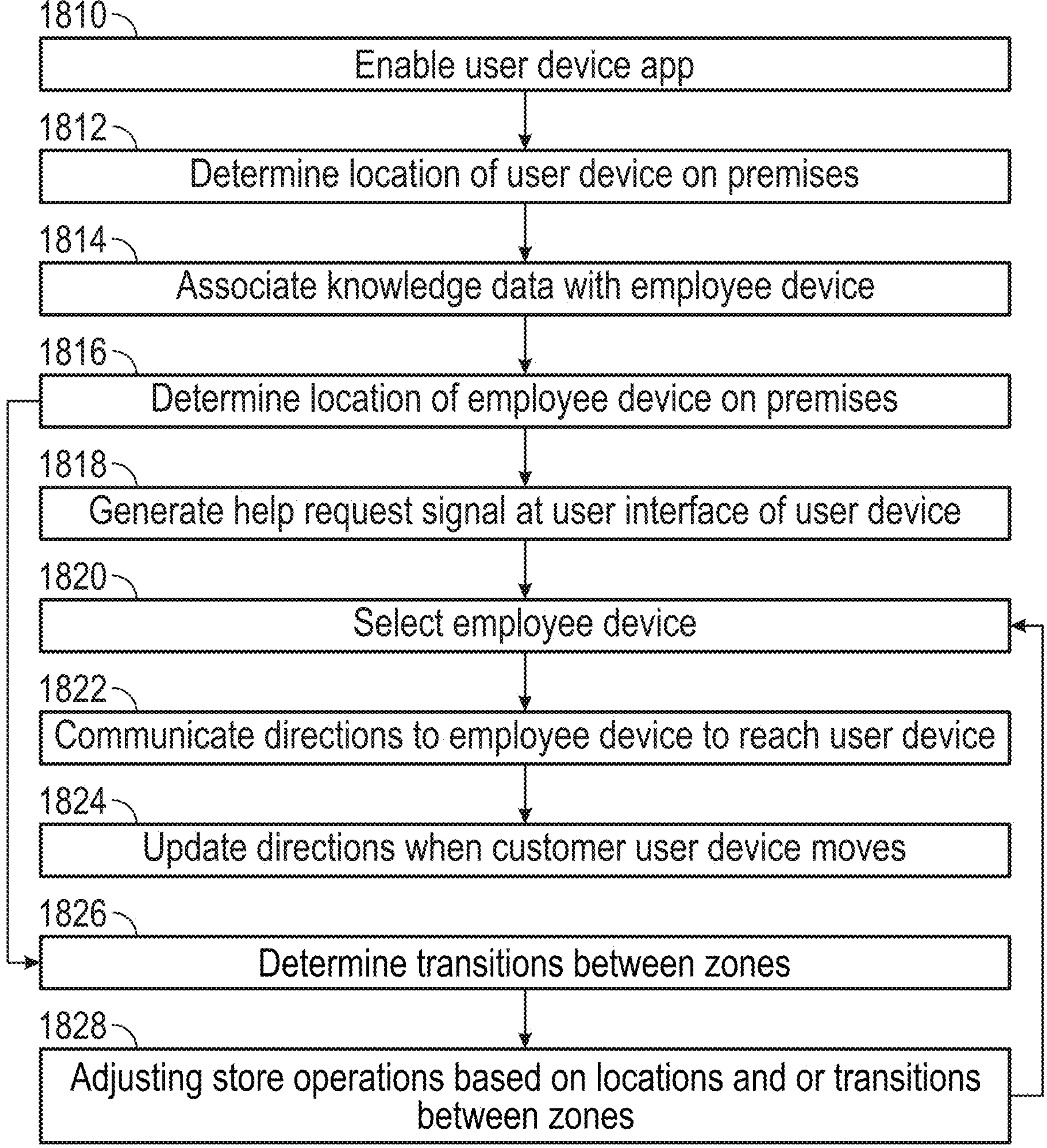
FIG. 18 is a flowchart of a method for directing an employee device to a user device.

Referring now to FIG. 18, the employee user device may be directed to a user in need. In step 1810, the user device application is enabled at step 1810. In step 1812, the location of the user device on the premises is determined. As mentioned, the cameras and the ranging sensors may be used to determine the location of the user devices. In step 1814, knowledge data may be associated with an employee device. That is, certain employees may have certain knowledge in certain categories. For example, plumbing, electrical, face creams, fresh produce and the like may be selected by an employee as areas of expertise. In step 1816, the location of an employee device on the premises is determined. As mentioned above, the employee device may be located in a similar manner to the location of the user device. In step 1818, a request for help may be generated at the user interface of the user device using the application. In step 1820, the system may select an employee at the employee selector controller 458 of FIG. 4. That is, a match to the type of request may optionally be generated so that a proper employee may be deployed to help the user. In step 1822, directions are communicated to the employee device so that the employee device can reach the user device. That is, step by step instructions may be provided so that the employee device may quickly and promptly reach the employee device. As the user device moves, the instructions may also be changed because the locations of both the user device and the employee device are changing. That is, updated instructions or directions from the employee device to the user device when the customer user device moves.

Referring back to step 1816, another use for determining positions of users and employees is set forth. In step 1826, the transitions between zones in a store may be tracked. in step 1828, store operation may be adjusted. In one example, store operation may communicate to an employee device of an assignment in a different location or zone of the store as in step 1820. Other store operations adjustments may include engaging a shopper nearby locating the shopper and adjusting the total amount of employees in an area.

Figure 19:
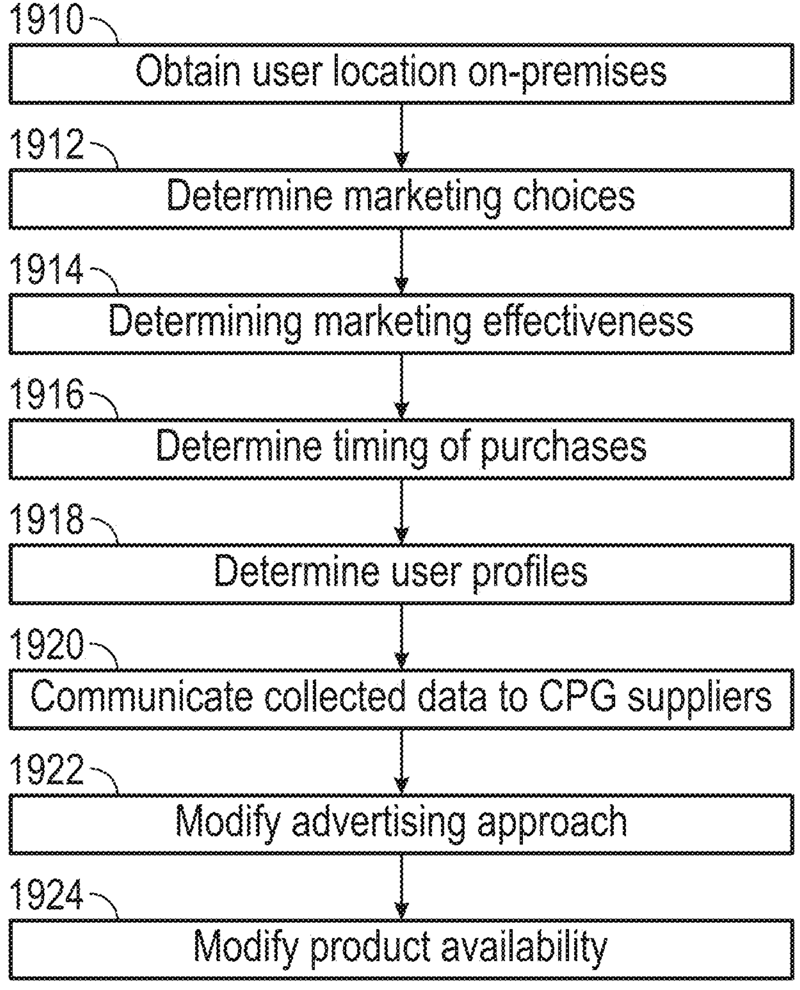
FIG. 19 is a flowchart of a method to provide data to the consumer package good provider to modify advertising approach based upon the collected data.

Referring now to FIG. 19, a method for modifying the customer package goods is set forth. In step 1910, the user location on the premises is determined. In step 1912, marketing choices may be determined. In step 1914, the effectiveness of the marketing choices may be determined for effectiveness. In step 1916, the timing of the purchases may also be determined. In step 1918, the user profiles are determined. The user profiles for many user devices and therefore users are determined in step 1918. In step 1920, the data collected may be communicated to the consumer package goods suppliers. That is, the effectiveness of the various marketing campaigns, whether direct displays at the premises or on the user device, may be determined for effectiveness by determining whether the products were purchased in step 1916. The user profiles are updated continually based upon the purchases and various advertisements selected. In step 1922, the advertisements and the type of advertising used by a consumer package goods supplier may be modified based upon the data collected from the premises and various premises within a retail chain. In step 1924, the product availability may also be modified. That is, when consumers are not purchasing certain products, the products may not be continued to be supplied to the various retailers for use on the various premises.

Figure 20:
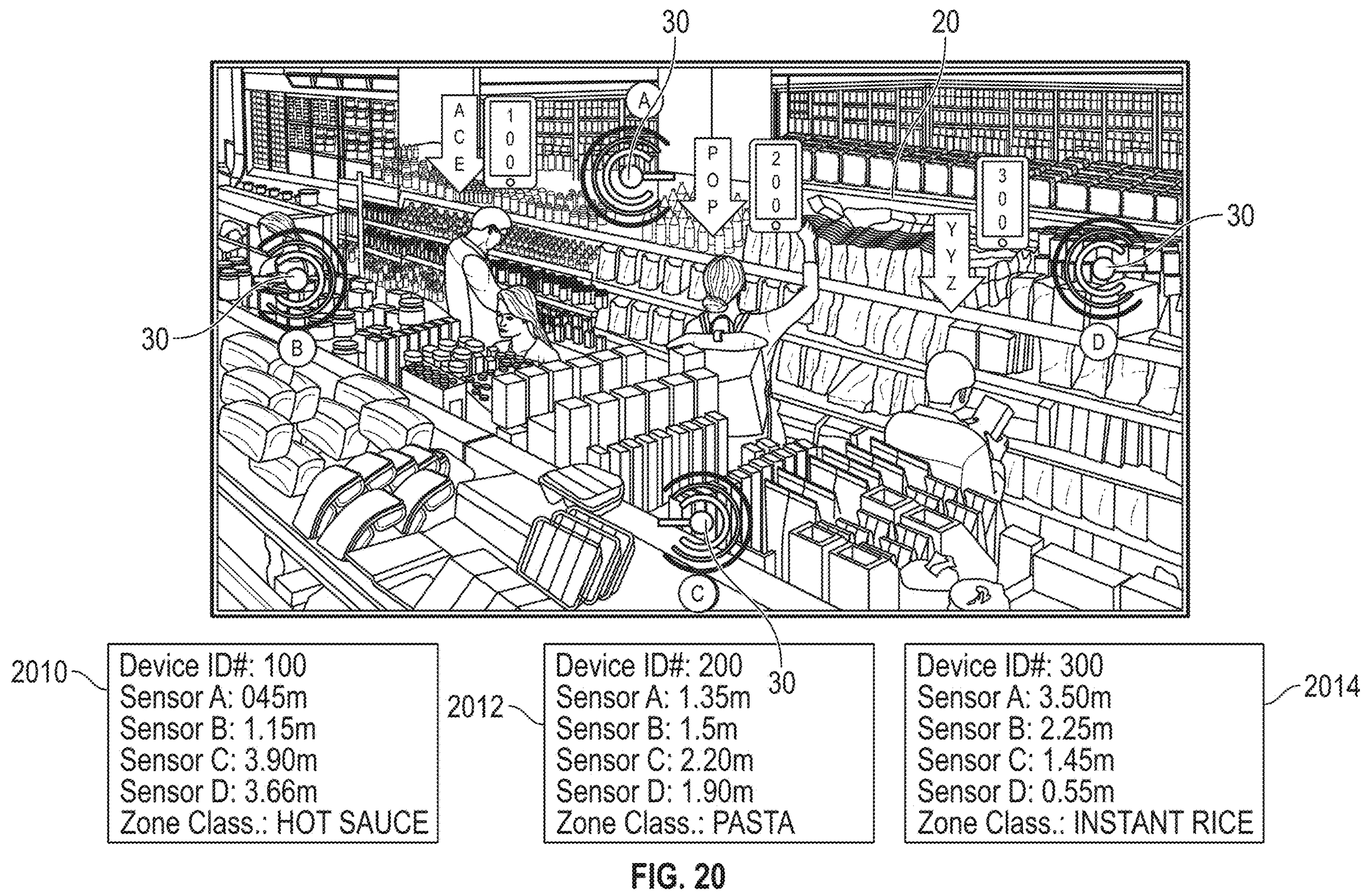
FIG. 20 is a perspective view of the system for determining the location of the users on the premises.

Referring now to FIG. 20, a diagram of shelving units 20 is illustrated with respect to three users and four ranging sensors 30. In this example, the ranging sensors are labeled "A", "B", "C" and "D". The data for a user identifier is set forth as "device ID" in the data boxes 1010, 1012 and 1014. In this example, the distances to each ranging sensor A, B, C and D are illustrated. The different distances allow the on-premises controller to relatively precisely determine a location. The person "Ace" is identified as device identifier "100" and is in a zone that is classified as hot sauce. The user "Pop" identified as device identifier "200" and is identified in the zone referred to as "pasta". The device identifier "YYZ" is positioned at the zone "instant rice". These methods may also be supplemented by the camera image which may also provide the orientation. Of course, the other sensors described above with respect to the user device may be used to provide the orientation of the user relative to the shelving units 20.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:

determining, at a ranging sensor controller, a plurality of locations of a user device within a premises, said user device associated with a user device identifier wherein determining the plurality of locations is performed by receiving signal strengths, an angle of arrival, a time difference between times of arrival of a radio signal and an above or below orientation of the user device relative to a product based on ranging sensors distributed throughout the premises and determining a user device journey based on the plurality of locations within the premises and a dwell time at each of the plurality of locations;

communicating the user device identifier and the plurality of locations to an on-premises controller;

matching a user profile to the user device identifier at a controller;

identifying the product associated with the journey of the user device at the controller;

communicating product data associated with the product to the controller; and communicating an advertisement to the user device from the controller based on the product data, wherein the on-premises controller determines a RF path and a camera path using images and the ranging signals to form a comparison to continually identify the user device within the premises.

2. The method of claim 1 further comprising updating the user profile to form an updated user profile at the controller based on the product data and wherein communicating the advertisement is based on the updated user profile.

3. The method of claim 2 further comprising determining a second location outside the premises, and wherein communicating the advertisement comprises communicating the advertisement to the user device from an off-premises controller when the user device is in the second location based on the updated user profile.

4. The method of claim 2 further comprising updating the user profile with purchase data to form the updated user profile.

5. The method of claim 2 further comprising updating the user profile with purchase data to form the updated user profile after the purchase is made based on a customer identifier provided to a point-of-sale device.

6. The method of claim 1 further comprising determining the orientation of a user based on at least one a camera image, a sensor of the user device comprising a magnetometer, a gyroscope, an accelerometer, an altimeter, a camera, a light sensor, a microphone and proximity sensor.

7. The method of claim 1 wherein updating the user profile comprises updating the user profile based on the dwell time at each of the locations.

8. The method of claim 1 wherein identifying the product comprises identifying the product based on at least one of a planogram of the premises, a store layout and product-location data sources.

9. The method of claim 1 further comprising generating the advertisement corresponding to the product or the product associated with the dwell time and not purchased.

10. The method of claim 1 further comprising generating the advertisement corresponding to a previous purchase or related product.

11. The method of claim 1 wherein communicating the advertisement comprises communicating the advertisement to the user device or a display device proximate the user device from the on-premises controller.

12. The method of claim 1 wherein determining the plurality of locations of the user device within the premises comprises determining the plurality of locations of the user device within the premises during a first visit and further comprising communicating a first on-premises advertisement proximate to the user device, determining a correlation of the first on-premises advertisement to a purchase, and changing the first on-premises advertisement to a second on-premises advertisement in a second visit when the first on-premises advertisement does not correlate with the purchase.

13. The method of claim 12 further comprising updating the user profile based on the correlation.

14. The method of claim 12 wherein communicating the first on-premises advertisement comprises communicating the first on-premises advertisement to at least one of a display screen adjacent to the product, a display screen to the user device, a speaker adjacent to the product or a speaker of the user device.

15. The method of claim 12 further comprising generating the first on-premises advertisement corresponding to the product or a related product.

16. The method of claim 1 wherein the controller comprises the on-premises controller.

* * * * *